(12) United States Patent
Jarocki et al.

(10) Patent No.: US 6,312,589 B1
(45) Date of Patent: Nov. 6, 2001

(54) APPARATUS ARRANGED TO PROVIDE CONTROLLABLE WATER TREATMENT CUSTOMIZED TO THE CONDITIONS OF WATER SUPPLIED TO A BEVERAGE DISPENSER

(75) Inventors: George J. Jarocki; Paul S. Sudolcan, both of San Antonio, TX (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 08/997,590

(22) Filed: Dec. 23, 1997

(51) Int. Cl.[7] ....................................................... C02F 9/00
(52) U.S. Cl. .............................. 210/87; 210/90; 210/103; 210/143; 210/202; 210/251; 210/266; 261/DIG. 7
(58) Field of Search .................................. 210/85, 87, 90, 210/96.1, 143, 251, 266, 284, 416.3, 900, 103, 202; 261/DIG. 7

(56) References Cited

U.S. PATENT DOCUMENTS

| | | | |
|---|---|---|---|
| 3,633,748 | 1/1972 | Hanley | 210/97 |
| 3,836,458 | 9/1974 | Wallis et al. | 210/259 |
| 3,870,033 | * 3/1975 | Faylor et al. | 210/900 |
| 4,659,460 | * 4/1987 | Muller et al. | 210/284 |
| 4,681,677 | 7/1987 | Kuh et al. | 210/88 |
| 4,759,474 | 7/1988 | Regunathan et al. | 222/189 |
| 4,761,295 | * 8/1988 | Casey | 210/266 |
| 4,784,763 | * 11/1988 | Hambleton et al. | 210/900 |
| 4,828,691 | 5/1989 | Abbott et al. | 210/87 |
| 4,844,796 | 7/1989 | Plester | 210/100 |
| 5,026,477 | 6/1991 | Yen | 210/169 |
| 5,064,534 | 11/1991 | Busch et al. | 210/266 |
| 5,268,300 | 12/1993 | Latura et al. | 436/53 |
| 5,384,032 | 1/1995 | de Souza | 210/104 |
| 5,401,399 | 3/1995 | Magnusson et al. | 210/136 |
| 5,468,373 | 11/1995 | Chou | 210/94 |
| 5,527,451 | 6/1996 | Hembree et al. | 210/88 |
| 5,536,395 | 7/1996 | Kuennen et al. | 210/87 |
| 5,611,937 | * 3/1997 | Jarocki | 210/87 |
| 5,622,618 | 4/1997 | Brane et al. | 210/88 |
| 5,628,895 | 5/1997 | Zucholl | 210/85 |

FOREIGN PATENT DOCUMENTS

| | | |
|---|---|---|
| 4028529A1 | 3/1992 | (DE) . |
| 0317525 | 5/1989 | (EP) . |
| 8404087 | 10/1984 | (WO) . |

* cited by examiner

*Primary Examiner*—Ivars Cintins
(74) *Attorney, Agent, or Firm*—Finnegan, Henderson, Farabow, Garrett & Dunner, L.L.P.

(57) ABSTRACT

A modular water treatment apparatus is provided for soft drink postmix dispensers. The apparatus includes a basic filter unit and additional modules selected from booster pump, UV treatment, and ion exchange modules as needed to match situs water problems determined water testing. A control module has microcontroller based circuitry which provides apparatus monitoring and control. Disabling and warning alarms are generated for predetermined apparatus conditions on a priority basis. A hand-held controller can be coupled to the control module to provide an operator interface for entry and readout of data on the basis of key entries.

11 Claims, 24 Drawing Sheets

APPARATUS ARRANGED TO PROVIDE CONTROLLABLE WATER TREATMENT CUSTOMIZED TO THE CONDITIONS OF WATER SUPPLIED TO A BEVERAGE DISPENSER

BACKGROUND OF THE INVENTION

The present invention relates to water treatment apparatus used in soft drink and other dispensers to purify water as it is processed in such dispensers. In soft drink or postmix dispensers, water is treated, carbonated, and mixed with syrup to produce the soft drink dispensed to customers or users.

In the production of soft drinks in a bottling plant, full water treatment purifies water according to the quality of the water supplied to the plant. Such water treatment typically reduces hardness, assures sterility, and removes suspended solids, dissolved organic matter, and possibly other matter such as sodium and nitrates.

Postmix (soft drink) beverage dispensing systems employ water treatment apparatus which operates on a small scale as compared to the complex and large scale water treatment provided at the bottling plant level. However, U.S. Pat. No. 4,844,796, entitled FULL WATER TREATMENT APPARATUS FOR USE IN SOFT DRINK DISPENSING SYSTEM, issued to George Plester on Jul. 4, 1989, and assigned to the present assignee, discloses a relatively simple and inexpensive, yet effective, water treatment apparatus for use in postmix beverage dispensers.

The quality of water received from a general water supply normally meets local purification needs, but the quality varies from location to location. Thus, additional water treatment needed at the situs of each postmix beverage dispenser may vary according to the local water supply. In particular, local drinking water quality in many parts of the world may require situs treatment for excessive turbidity (suspended particles), microbiological or chemical problems, or undesirable taste and odor.

As a result, water treatment apparatus for postmix beverage dispensers typically have been designed inefficiently on a one-by-one basis according to situs water treatment needs. Further, such prior art designs have often resulted in apparatus lacking a match of treatment units to water problems at the installation situs. In other words, some guesswork has often been used in creating designs for prior art water treatment apparatus to be installed at a particular situs.

Further, even where acceptable matches have been made in installed treatment units and situs water problems, the operators often would not know or adequately plan in advance when installed filters became used up. In these cases, the lack of water has caused carbonator pump burnup.

Moreover, if problems in the water supplied to an installed prior-art water treatment apparatus were to change after installation, a new design and a new or modified water treatment apparatus has been required to match the changed problems in the water supply. Again, the new or modified apparatus would typically involve some design guesswork. In any case, excessive cost would be incurred and the new water treatment requirements might or might not be met.

Accordingly, for economy in manufacture and distribution, postmix water treatment apparatus needs to be structured so that it can be readily and economically customized to water treatment requirements at the installation situs at the time of installation, as well as subsequently during the apparatus lifetime if water treatment requirements change at the situs.

Further, postmix water treatment apparatus requires maintenance to assure continuing efficacy of water treatment as usage occurs over time. Maintenance has typically been provided by scheduled replacement of treatment cartridges, and, in some instances, in response to automatic indications of end-of-cartridge-life. Thus, a need has also existed for better real time monitoring and control in dispenser water treatment apparatus to enable better maintenance by the owner/user and better efficacy in water treatment.

SUMMARY OF THE INVENTION

The present invention is directed to water treatment apparatus which is modularly structured to facilitate economic customization of the apparatus for local use and which is provided with monitoring and control capabilities enabling better apparatus maintenance and more effective water treatment in soft drink postmix dispensers and in other applications.

In accordance with the invention, water treatment apparatus comprises an arrangement of modules which can be variably configured by varying the modules selected for inclusion in a water treatment configuration for a particular situs at which water from the situs water supply has been tested to identify water problems. The modules include a basic filter module and other water treatment modules which, when connected together, provide full water treatment.

The modular arrangement is configured to an original configuration, for the particular situs, to include the basic filter module and any, all, or none of the remaining water treatment modules connected together according to the water treatment needed at least to match the identified water problems. A booster pump module preferably operates to boost inlet water pressure if low water pressure is determined to be a water problem. A monitoring and control system preferably interfaces with the water treatment apparatus and responds to sensed system parameters to provide data readouts, generate alarms, and apply control actions to the apparatus.

The objects of the invention are still further fulfilled by an apparatus having a flow path for water being treated with the apparatus comprising a booster pump, a basic filter, and an ion exchange chamber connected in the flow path. A pressure sensor and a flow sensor are also coupled to the flow path.

A monitoring and control system responds to an output from the pressure sensor to provide ON/OFF cycling control of the booster pump for outlet water pressure control.

The monitoring and control system further responds to an output from the flow sensor to determine total flow over time. The monitoring and control system also generates at least a basic filter replacement alarm when a low water pressure setpoint is detected and an ion-exchange-resin replacement alarm when a setpoint total water flow is reached.

The objects of the invention are still further fulfilled by a method for assembling water treatment apparatus for treating water supplied to a particular situs. The steps of the method include testing the situs water to determine situs water problems and determining an arrangement of water treatment modules which can be variably configured by varying the modules selected for inclusion in a water treatment configuration for the particular situs. The modules include a basic filter module and other water treatment modules which, when connected together, provide full water treatment.

The arrangement is configured to an original configuration, for the particular situs, to include the basic filter module and any, all, or none of the remaining water treatment modules connected together to match water problems identified from the water testing step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings illustrate a preferred embodiment of the invention and are incorporated in and constitute a part of the specification. The drawings and the description in the specification provide an explanation of the objects, advantages, and principles of the invention. In the drawings.

DESCRIPTION OF PREFERRED EMBODIMENTS

A modular water treatment apparatus of the invention economically, efficiently and reliably resolves problems commonly found in drinking water in many parts of the world, including: excessive turbidity, microbiological, chemical, and presence of undesirable taste and odors. These water problems make local drinking water unsuitable or undesirable for postmix dispensing of soft drinks and, in many cases, also for dispensing of drinking water and coffee, tea, and other water based beverages. Postmix business volume is adversely affected by these water problems unless they are properly resolved.

The modular nature of the water treatment apparatus of the invention facilitates combining treatment units to structure a specific water treatment apparatus which resolves particular water problems. In applying the invention, such problems are identified by analysis of supply water at a situs where the specific water treatment apparatus is to be installed. Since each type of treatment module is known to be effective in satisfactorily meeting its intended purpose, any combination of the modules also results in an effective water treatment system. With use of the invention in soft drink postmix operations, bottlers need not be concerned with selection of water treatment components, verification of component performance claims, and reliance on suppliers in determining how to configure a water treatment system.

Water Treatment Apparatus for Postmix Soft Drinks

Figure 1:
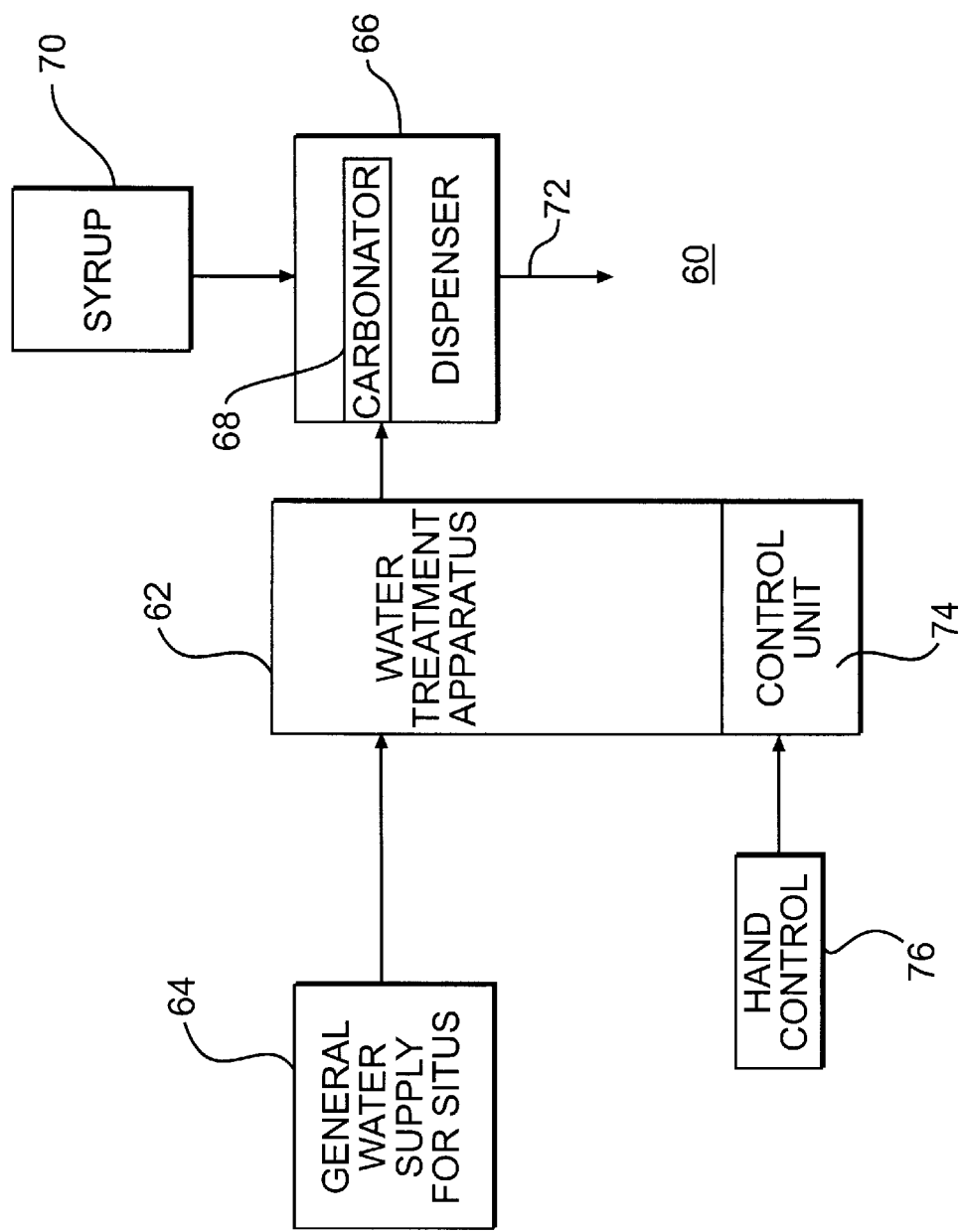
FIG. 1 is a block diagram representing a postmix beverage dispensing system including a dispenser and a water treatment apparatus which is structured and operative in accordance with the principles of the invention.

A system 60 shown in FIG. 1 is located at a specific situs and dispenses postmix soft drinks with water treated to meet or exceed postmix standards in accordance with the invention. A general water supply 64, located at the situs, supplies water to a water treatment apparatus 62 of the system 60. After treatment, the water flows to a soft drink dispenser 66 where it is carbonated by a carbonator 68 and mixed with syrup from a syrup supply 70 for discharge as indicated by the reference character 72.

The water treatment apparatus 62 includes a control unit 74 which performs various monitoring, alarm, and control functions in the operation of the apparatus 62. A hand-held controller 76 preferably provides an interface for operator setup and control of the apparatus 62.

Figure 3:
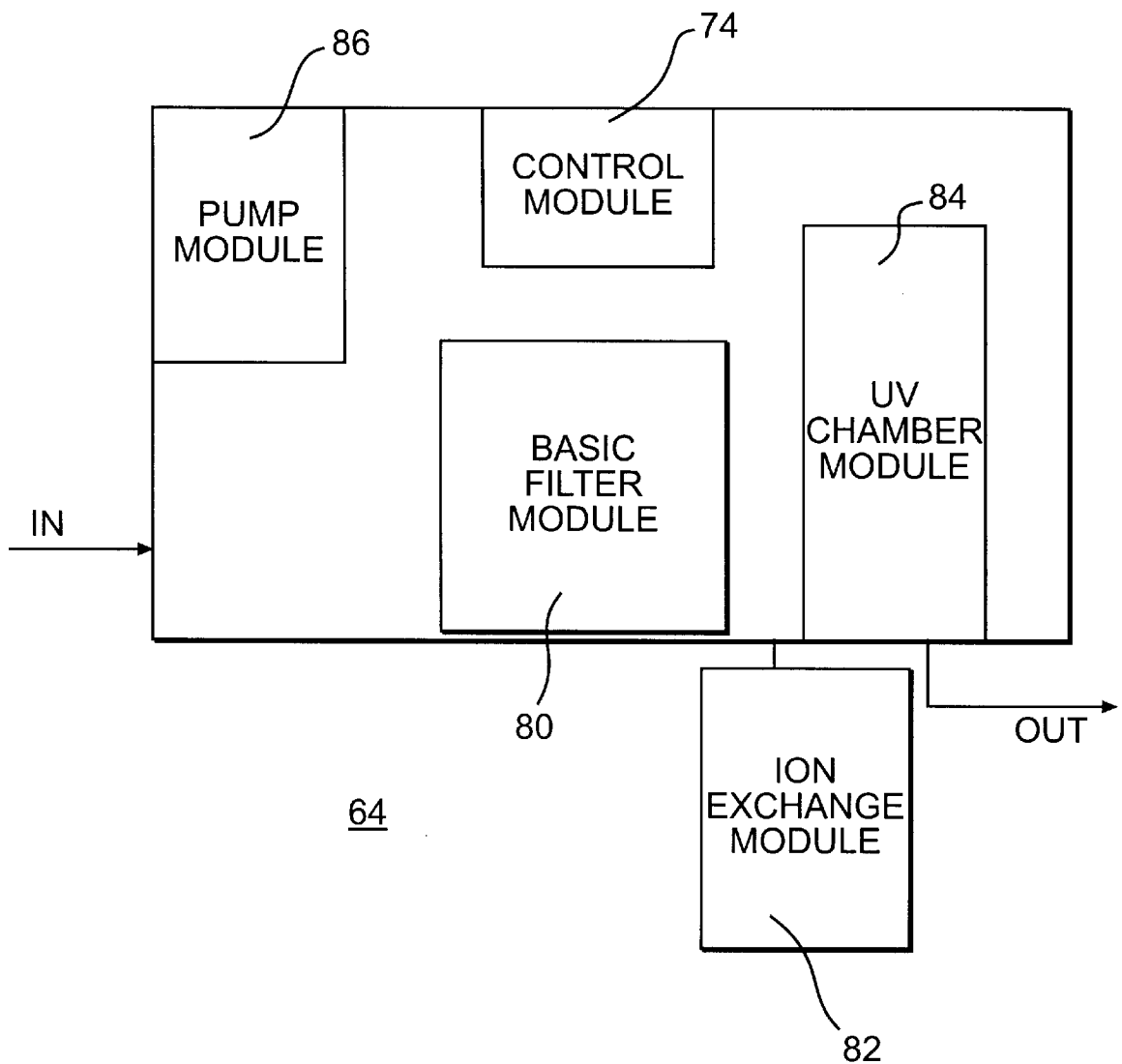
FIG. 3 shows a block diagram representing the modular organization of the water treatment apparatus of FIGS. 1 and 2.

The water treatment apparatus 62 is preferably modularly arranged as illustrated in FIG. 3. In its preferred modular organization, the apparatus 62 has treatment modules including a basic filter module 80, an ion exchange module 82, and a UV module 84. The apparatus 62 further includes a control module (corresponding to the control unit 74 of FIG. 1) and a pump module 86. The treatment and pump modules can be embodied by commercially available units.

The water treatment apparatus 62 is modularly configurable to provide a specific apparatus which resolves the water problems determined to exist at the situs where the specific apparatus is to be installed. Thus, the apparatus 62 can be readily customized to provide water treatment in a wide range of locations.

With the preferred modular arrangement, the installer can customize the water treatment apparatus 62 by making a selection from at least the following modular configurations (each including the control module):

a. base filter with or without water pressure booster pump having a bypass;

b. UV system and base filter with or without water pressure booster ump having a bypass;

c. ion exchange system and base filter with or without water pressure pump having a bypass;

d. ion exchange system, base filter, and UV system with or without water pressure pump having a bypass;

e. any of a. through d. with a bladder tank and a pump without a bypass in place of the bypass pump.

Further, the owner or operator of an installed and customized water treatment apparatus 62 can readily reconfigure the installed apparatus to match a changed set of water problems. For example, a pump with a bypass can be added to an apparatus originally installed without such a pump in order to resolve developing water pressure deficiencies. As another example, an ion exchanger can be readily added to an apparatus if it was not originally supplied and if new water problems require use of an ion exchanger.

The preferred modular arrangement of the invention is structured to accept only the specified modules, yet it meets a wide range of water treatment needs for customization to many if not most locations. However, in applying the invention, other modular arrangements of water treatment units and other operational units can be embodied in accordance with the modularity aspect of the invention.

For example, a reverse osmosis module may be included with some or all of the preferred apparatus modules in another modular arrangement to provide another water treatment capability for customization of water treatment apparatus. As another example, future developed water treatment modules could be included in a modular design of the invention to provide the treatment capabilities of such modules in matching the configuration of water treatment apparatus to the water problems found to exist at the location where the apparatus is to be installed.

Figure 2:
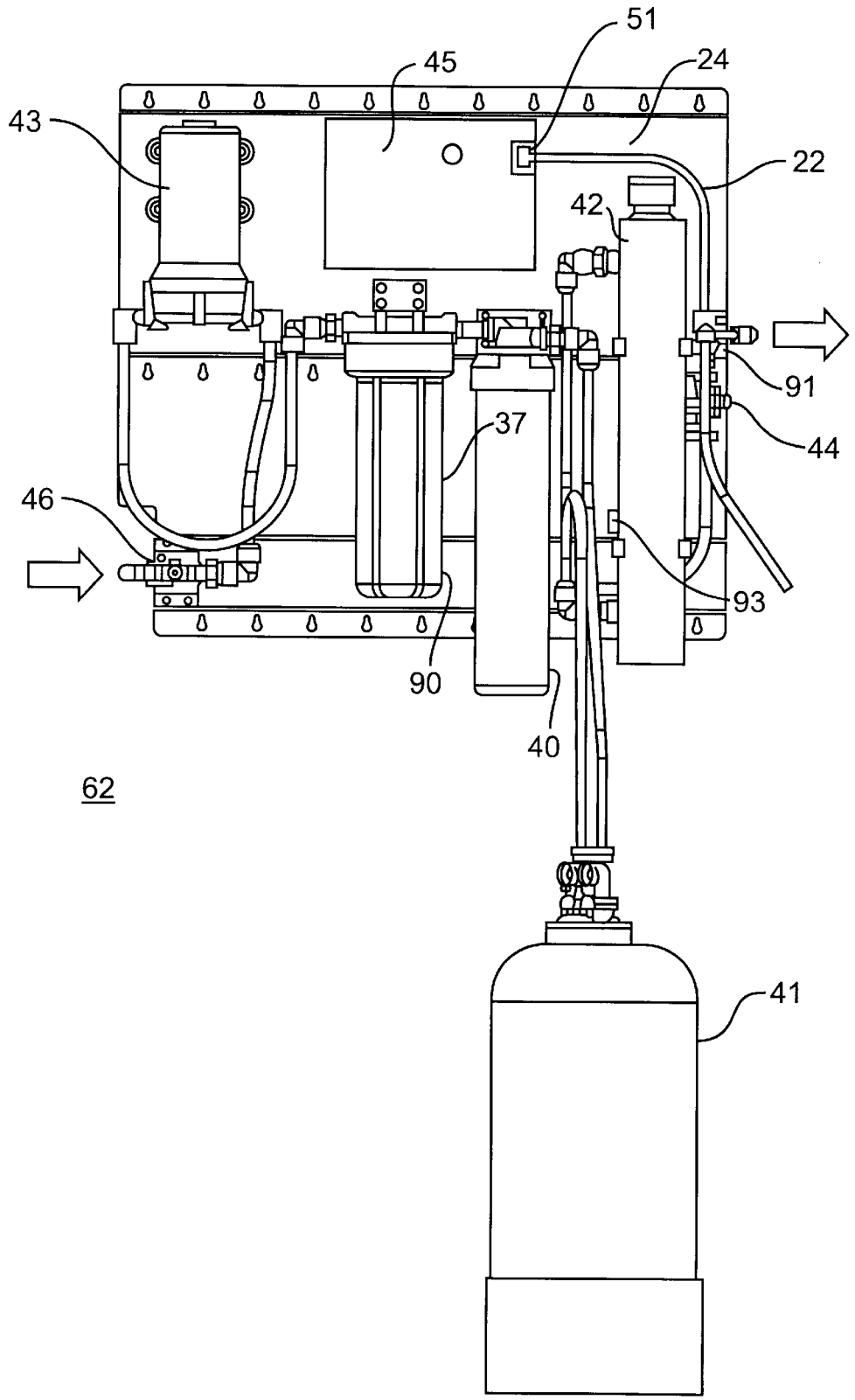
FIG. 2 is a schematic diagram illustrating a preferred modular arrangement of the water treatment apparatus of FIG. 1.

The preferred physical arrangement for a full configuration of the modular apparatus 62 is illustrated in FIG. 2. APPENDIX B presents a list of elements for the full configuration with corresponding reference characters.

A backplate 24 is sized and arranged to support elements of the water treatment apparatus 62. An ON/OFF valve 47 controls the supply of input water to a booster pump 43 having a flow controllable bypass and mounted on the backplate 24. Pressurized water flows from the pump 43 to a basic filter 90 mounted on the backplate 24 and comprising a sediment filter 92, with a preferred 5 micron prefilter, and a carbon microfilter 94, with a preferred 0.5 micron carbon block or carbon precoat filter. The prefilter protects the microfilter from premature plugging by removing most larger particles.

Water flows from the basic filter 90 to an ion exchange chamber 41. Generally, ion exchange chambers are relatively heavy, and the chamber 41 is therefore preferably not mounted to the backplate 24, and, instead, is disposed on a floor or other flat surface for vertical support under the backplate 24.

Flexible lines preferably form water flow connections to and from the ion exchange chamber 41. Generally, quick connect/disconnect connectors are used in making necessary module and line connections over the water flow path in the apparatus 62. The water flows from the ion exchange chamber 41 to a UV chamber 42, mounted on the backplate 24, for final treatment prior to output to the carbonator 68 (FIG. 1) in the dispenser 66. A low cost UV intensity sensor 93 is provided in the UV chamber 42 to generate UV intensity signals for monitoring and control purposes. In addition, a flowmeter 44 is coupled to the outlet water flow to generate flow signals for monitoring and control purposes.

A control box 45 is mounted on the backplate 24 to house monitoring and control circuitry for the water treatment apparatus 62. Necessary electrical connections (not shown in FIG. 2) are made from the control box 45 to various sensors or electrically operated elements of the water treatment apparatus 62.

A pressure pilot line 22 is connected from the outlet flow path to the control box 45 to enable outlet pressure signals to be developed for monitoring and control purposes.

Generally, the water treatment apparatus 62 can be placed in a concealed location with the backplate 24 mounted on a vertical wall or the like. In this case, connection lines are run to the dispenser 66 over a distance preferably not to exceed about thirty feet for the preferred embodiments disclosed herein.

Alternatively, the water treatment apparatus 62 can be located under a counter on which the dispenser 66 is located in a fast food restaurant or the like. In this case, interconnection lines would be very short.

The basic filter module 90 (or 80, FIG. 3) is preferably mounted on the backplate 24 in all soft drink postmix applications of the invention, as well as other applications such as drinking water and other beverage applications. This basic filter module includes a prefilter 39 (FIG. 4A) and a carbon block filter 40 (FIG. 4A) and acts as a barrier to particulates 0.5 microns in size and larger, reduces turbidity to 0.5 NTU or less, and removes waterborne cysts of concern, such as Giarda Lamblia and Cryptosporidium. The carbon block filter 40 performs most of the filtration duties which further include reducing excessive chlorine concentration, eliminating unpleasant tastes and odors, and removing some organic materials. The filter 39 removes larger particles thereby extending the life of the filter 40. The filters 39 and 40 preferably are provided with a special mount (not specifically shown) which limits replacements to units which meet the treatment standards set for the apparatus 62.

Figure 4A:
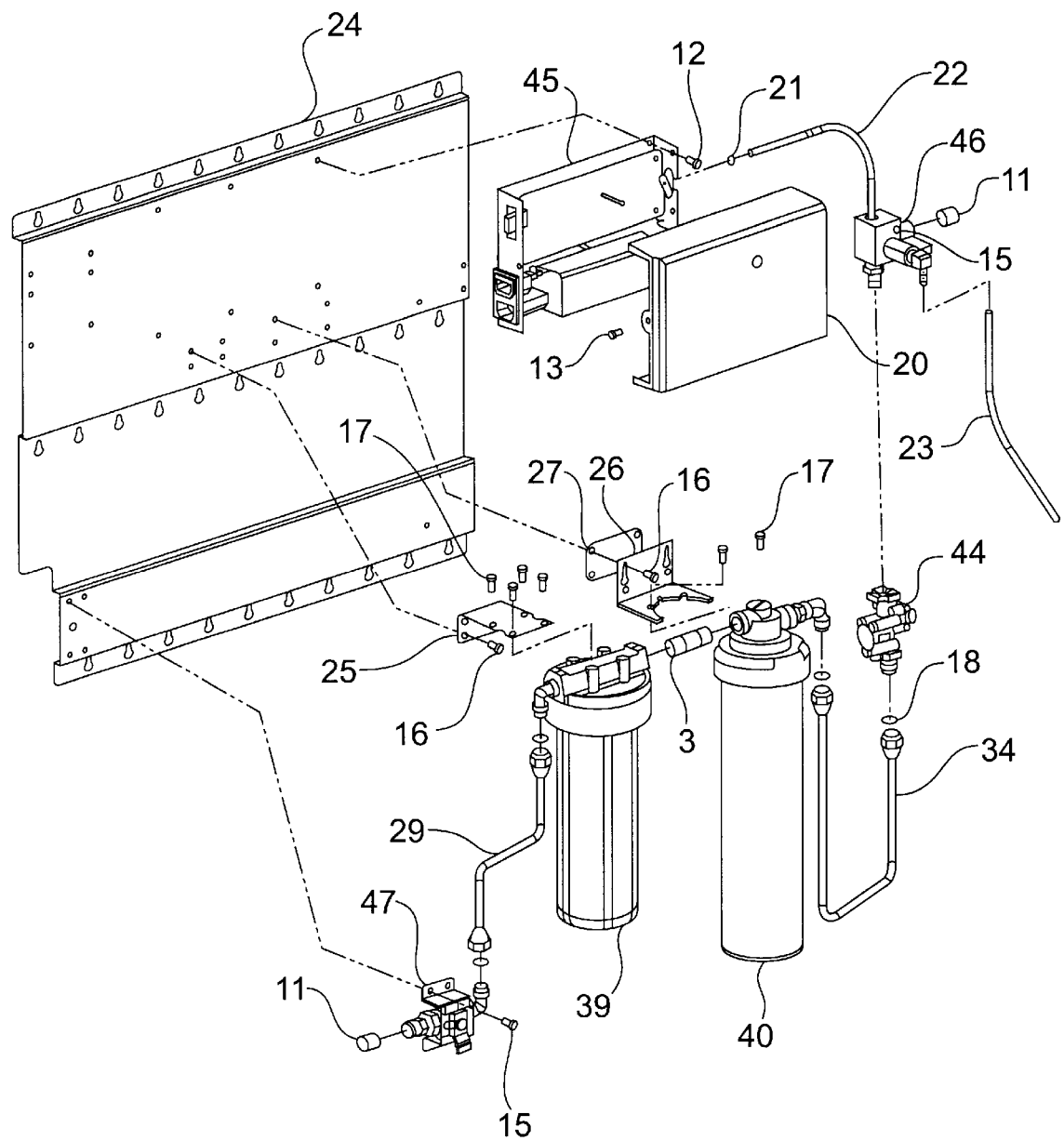
FIGS. 4A–4I are schematic perspective diagrams of various modular configurations in which the modular water treatment apparatus may be embodied as titled in these FIGURES.

In a basic filtration system without water pressure boosting FIG. 4A), the water treatment apparatus 62 includes the basic filter 90, the inlet ON/OFF valve 46, water pressure sensor including a pressure sensor with the pressure pilot line 22, the flowmeter 44, an outlet purge valve 91, and the control box 45 with its contained control circuitry for the pressure sensor, and the flow totalizer.

In a basic water filtration system with water pressure boosting (FIG. 4B), the apparatus 62 further includes the pressure boosting pump 43 (with bypass). The control box 45 includes control circuitry for the pump 43. Necessary water flow and electrical connections are made for the pump 43. The pump plugs directly into the control box 45.

The backplate 24 is sized to provide common support for the basic filter module 90 and other modules which configure the water treatment system for customized applications. In the preferred embodiment, the UV module 84 (or 42) and the ion exchange module 82 (or 41) are water treatment modules which can be combined with the basic filter module 80 (or 90) to form different configurations for different customized applications, with the UV module 84 being mounted on the backplate 24. The booster pump 43 is another module mounted on the backplate 24 when selected to be included in a customized configuration.

In other applications of the invention with different modular arrangements, the combinable modules are determined on the basis of the treatment/processing capabilities of the respective modules.

The pressure booster pump 43 is incorporated in particular applications, where it is needed as determined by water pressure measurements. The pump 43 is electrically connected to the control box 45, which contains pump drive circuitry. In addition, two water lines connect the pump 43 to the basic filter 90.

Generally, incoming water pressure plays an important role in the service life of the basic filters. Incoming water pressure above 45 psig (flowing) is preferred. When a booster pump is included in the apparatus 62, the user operates the hand-held controller to set low and high pressure setpoints.

Figure 4B:
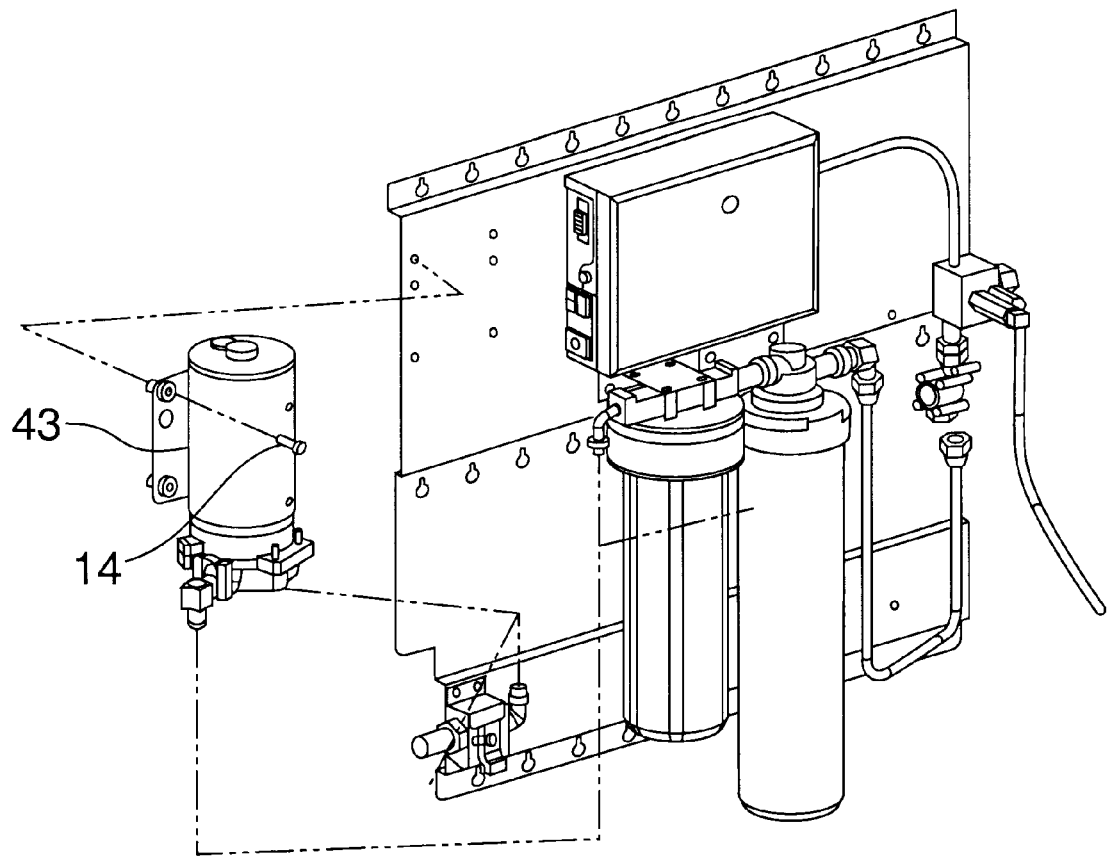
Figure 4C:
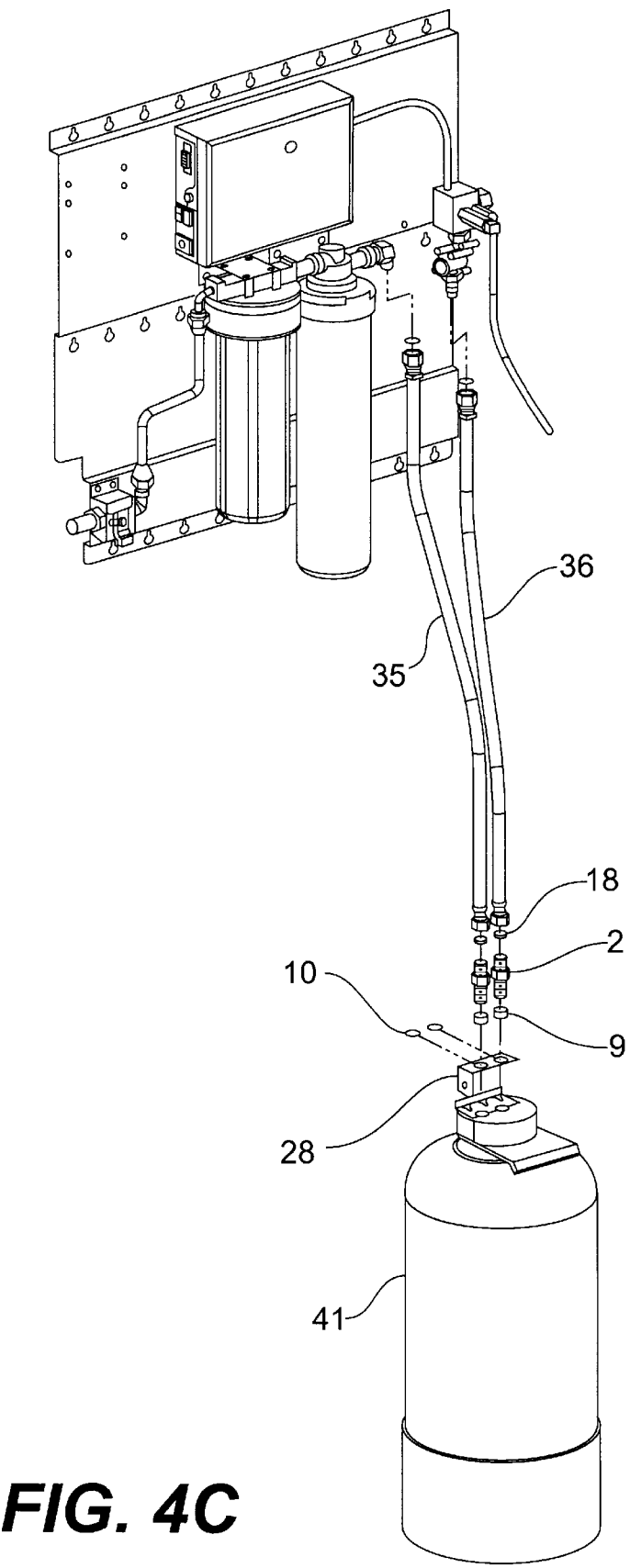
Figure 4D:
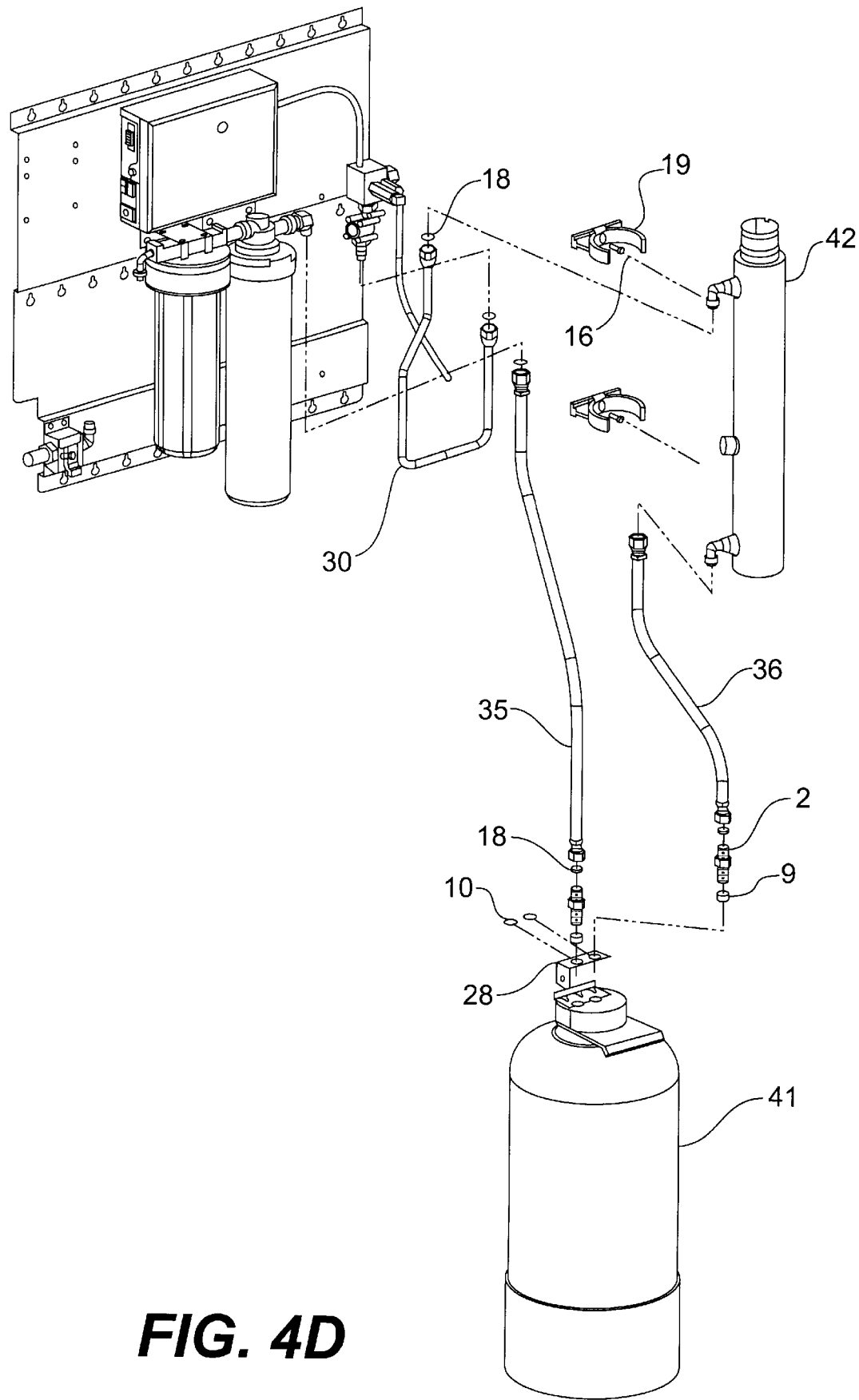
Figure 4E:
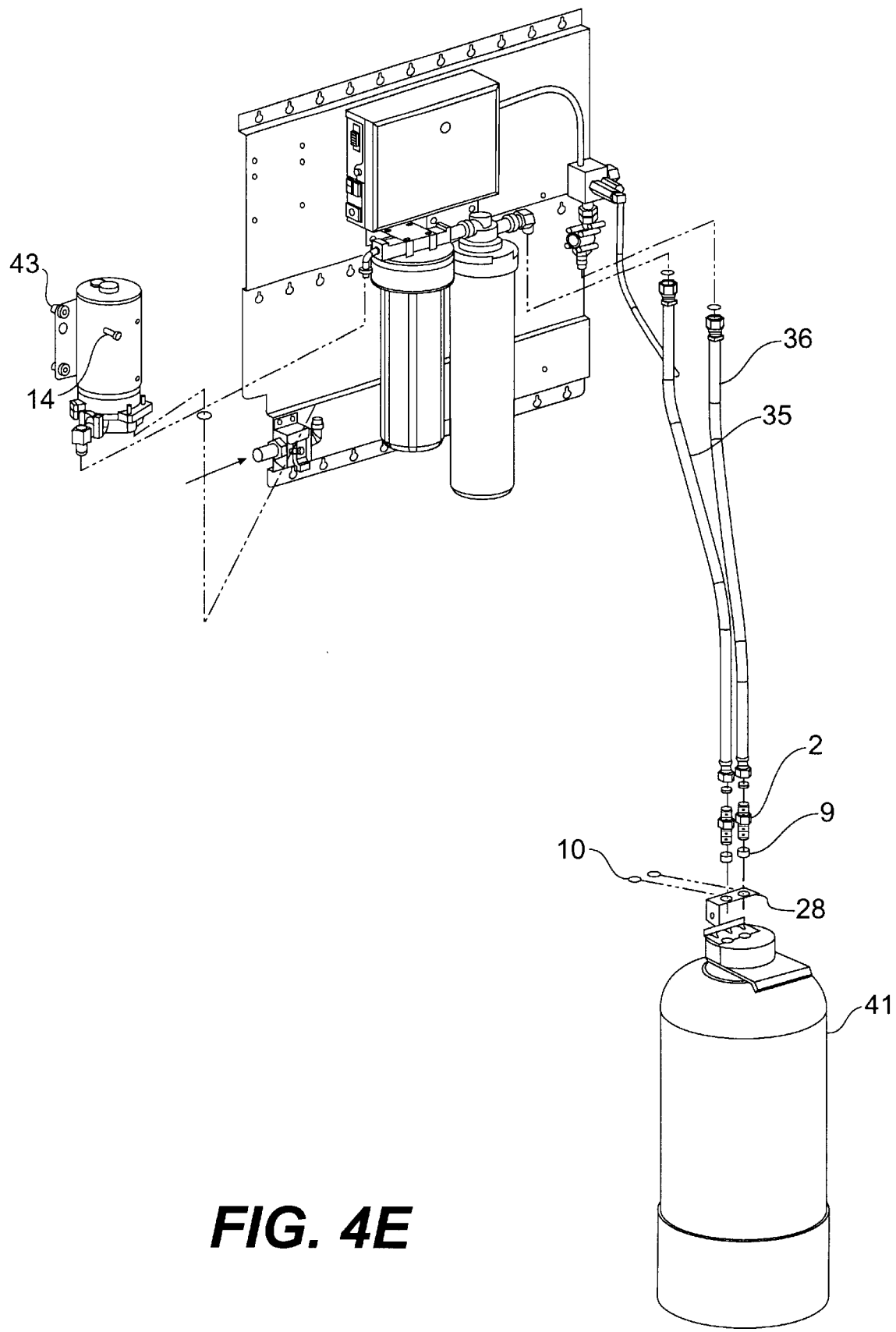
Figure 4F:
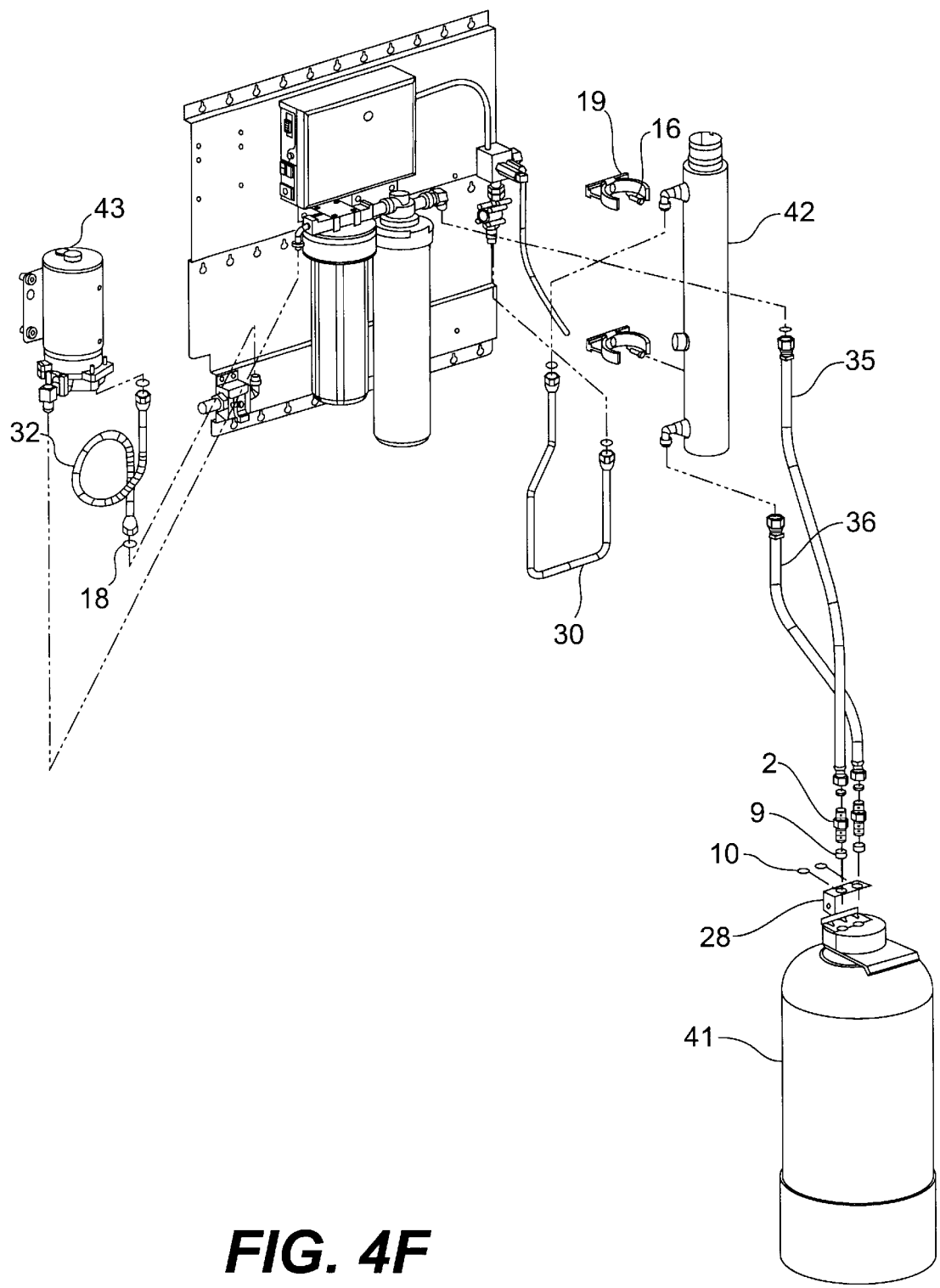
Figure 4G:
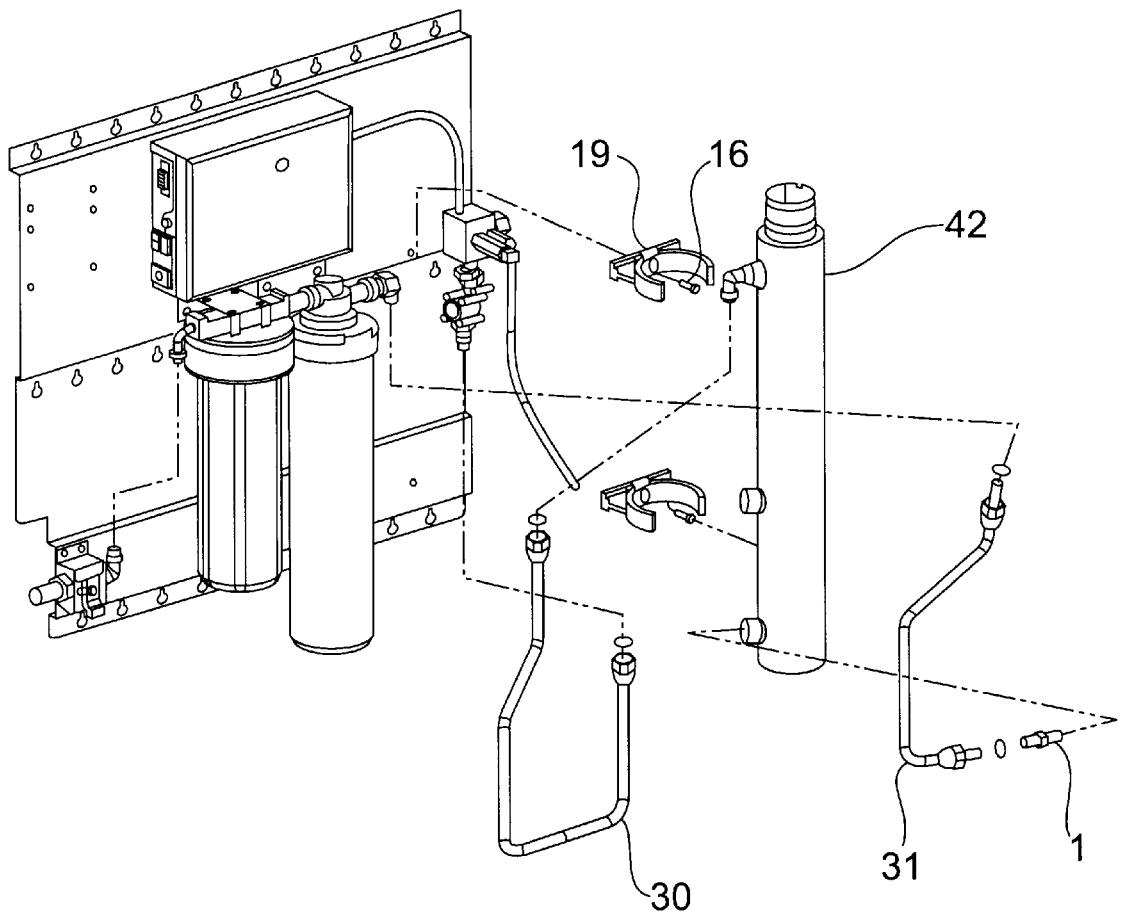
Figure 4H:
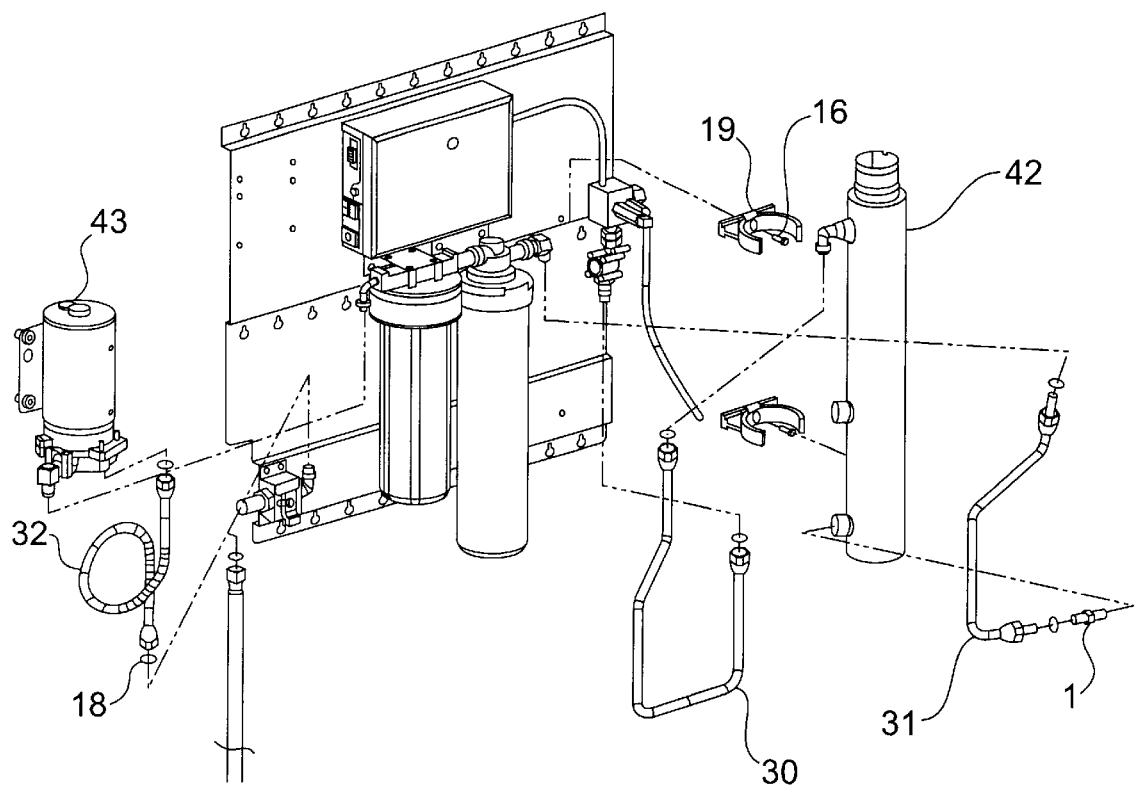

A UV water treatment system without pressure boosting is created by combining the UV module 42 with the basic filter system (FIG. 4G). The UV module 42 is installed on the backplate 24, and a UV control board is installed in the control box 45. The UV module 42 includes the UV intensity sensor 93 for monitoring the effectiveness of UV treatment. Water pressure boosting can also be provided (FIG. 4H), as in the case of the basic water filtration system.

Generally, the UV water treatment system resolves all known bacteriological concerns in postmix water. Fine filtration removes Giardia Lamblia and Cryptosporidium cysts, and the UV radiation deactivates bacteria and viruses. This system also provides the water treatment effects described for the carbon block filter 40.

An ion exchange water treatment system combines the basic filtration system with the ion exchange module 41. The water pressure booster pump 43 is also included when low water pressure conditions exist at the situs for which the system is being customized. Further, the UV module 42 is excluded only if incoming water satisfies microbiological criteria on a continuous basis and there is no danger of an excessive buildup of bacteria in the system. Perspective views of the different ion exchange systems are shown in FIGS. 4C–4F.

The ion exchange system reduces excessive alkalinity and hardness and removes dissolved chemicals from the water to improve the taste of soft drinks or other system product. Some chemicals can create off-taste problems, such as a bitter or salty taste or may neutralize flavors causing flat tasting drinks.

The resin used in the ion exchange module 41 can be selected to resolve these off-taste problems, on the basis of which chemical(s) is or are causing the problem at the situs for which the system is being customized. The resin reduces the concentration of the chemicals causing the problem or problems.

The user inputs results of a chemical water analysis to the hand-held controller to determine an approximate water treatment capacity of the selected resin. The expected resin capacity is then computed under computer program control and displayed on the hand-held controller. At the same time, an alarm setpoint is generated so that an alarm will be generated when the resin has reached the end of its expected service period. During operation, the user can also operate the hand-held controller to read the volume of water passed through the system as an indication of the remaining resin life before regeneration will be required.

The ion exchange system also provides the water treatment effects described for the basic filtration system, and the water treatment effects described for the UV module 42 if it is included.

Figure 4I:
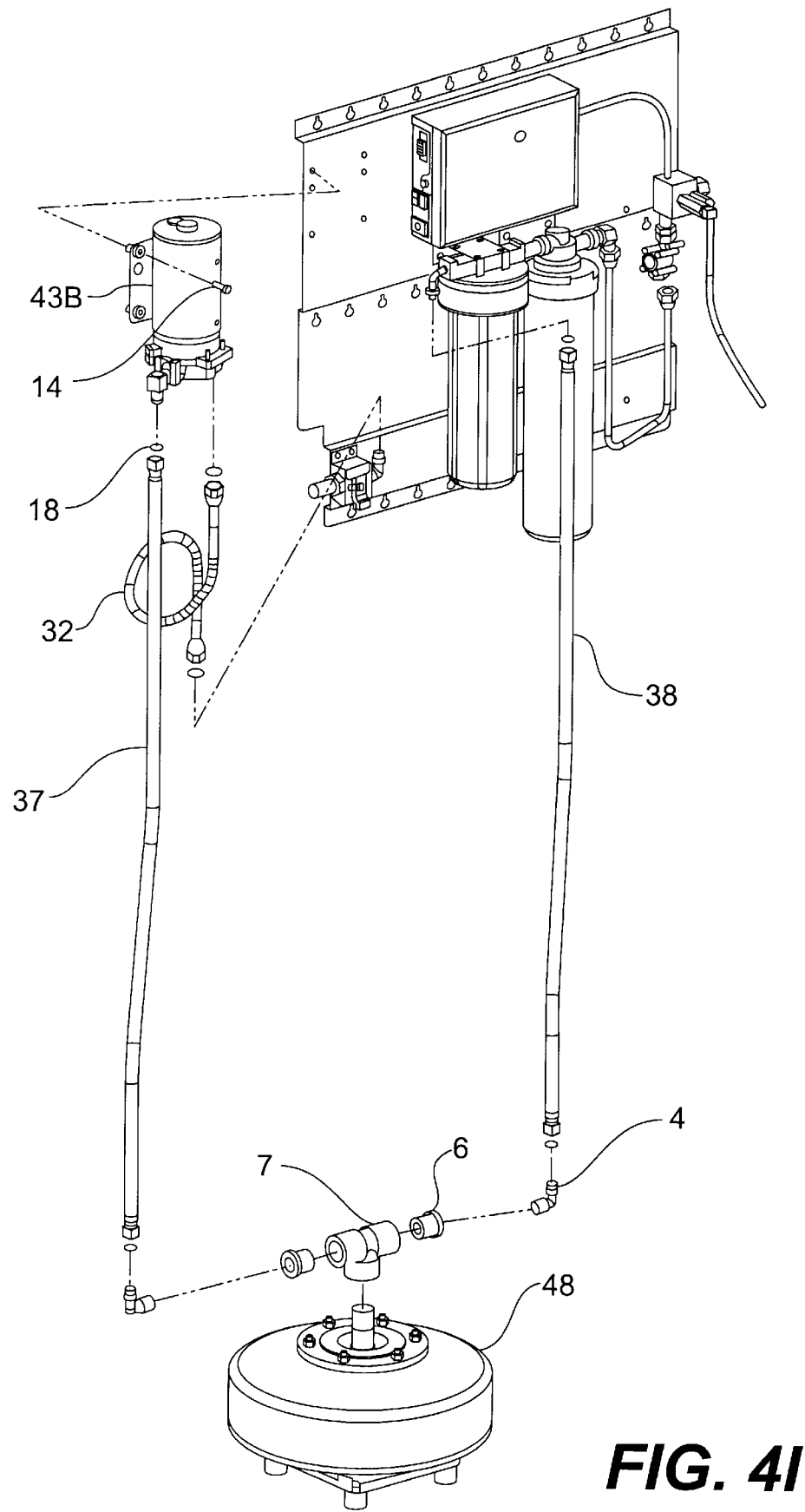

FIG. 4I illustrates a basic system configuration in which a pump 43B, without a bypass, is combined with a bladder 48 (storage tank) in place of the booster pump 43 (with bypass) of the configuration of FIG. 4B. Required water pressure is developed in the bladder 48 by compressed air. The same replacement can be made in each of the other illustrated configurations of FIGS. 4E, 4F, and 4H to provide additional possible configurations of the apparatus 62.

In determining how to customize the water treatment apparatus 62, the supplier or the owner checks the water pressure and obtains tests of water from the situs water supply 64 to ascertain the water problems to be resolved. Water testing preferably includes microbiological and chemical analysis.

In the preferred soft-drink postmix embodiment, water problems are identified by comparing the water test results to standards applicable to postmix water. A table presented in APPENDIX A provides some example of system configurations for various water conditions or problems. If the water pressure is below a threshold condition (i.e., below 45 psig at 1.7 gallons/minute flow in the preferred embodiment), a booster pump should be included in the customized configuration.

Monitoring and Control

Generally, the monitoring system generates an alarm for water pressure below a programmable value, warns an operator to change the filters based on six months service life, and serves as a control and driving circuit for the water booster pump when it is included in the apparatus 62. In addition, the user can set or read a number of system parameters, preferably through the hand-held controller, including current water pressure, total water flow measured from a filter replacement date, and elapsed time from the last filter change.

In the preferred embodiment, UV lamp life and UV lamp intensity are monitored when the UV module is included in the apparatus 62. The system activates an alarm if the UV lamp has been in service for more than a year or if UV intensity falls below 30,000 microwatts.sec/cm$^2$.

In the preferred embodiment, three sensors monitor the water treatment processes as a basis for system monitoring and control. The control box 45 includes a main microcontroller which processes feedback signals from the sensors to activate visual and/or audible alarms when malfunctions occur or maintenance is needed.

Figure 6A:
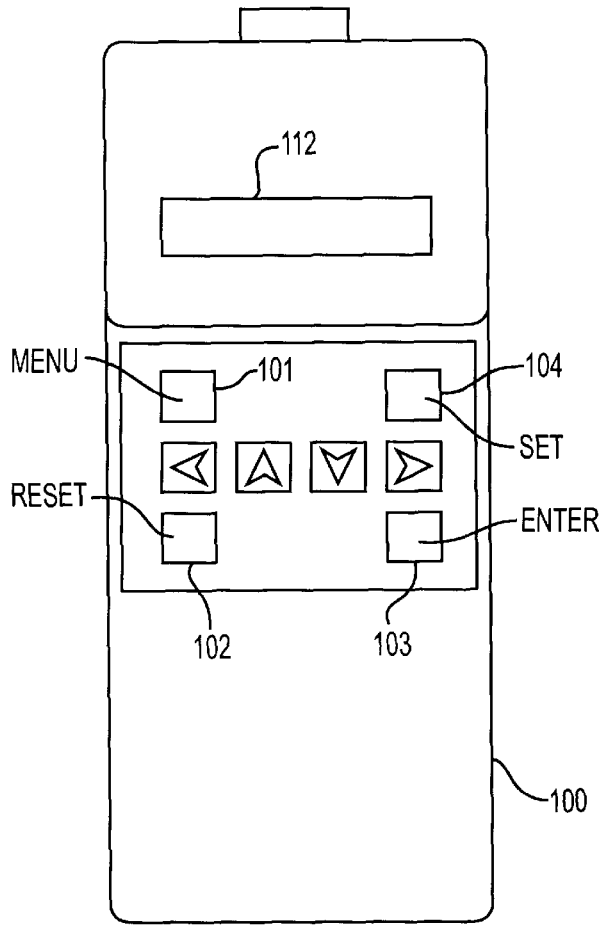
FIG. 6A is a top plan view of a hand-held controller which provides a control interface between an operator and control circuitry in the control box.

A hand-held controller 100 (FIG. 6A) operates as an operator interface. The controller 100 is directly connectable to the control box 45 and has circuitry including a microcontroller for processing operator input commands, for generating readouts of process data from the control box 45, and for setting various process parameters to the control box 45. If desired, a remote radio coupling (not shown) can be used, in place of the direct connection, to couple the hand-held controller 100 to the control box 45.

The control box 45 performs a number of control, status, and setpoint adjustment functions, all of which can be accessed for viewing or resetting by the hand-held controller. On the front of the control box 45, three color LED lamp indicators show the operating condition of the system.

A green lamp indicates the system is operating normally. A yellow flashing every five seconds and a beep is sounded about once every minute when a warning condition has occurred in the system. The system flashes a red lamp and a beep is sounded every five seconds when a disabling condition has occurred in the system.

The system preferably processes all alarms and warnings on a priority basis so that only the highest priority active alarm is displayed. If more than one alarm is active and the priority alarm is cleared, the next highest priority alarm is indicated. Preferably, every disabling alarm cuts off power to the booster pump (if included) and a carbonator pump motor located in the dispenser. APPENDIX C provides a table of suggested priorities for the alarm system.

In this instance, a conventional pressure transducer 51 (FIG. 2) is disposed in the control box 74 to generate an electrical signal indicative of the outlet water pressure sensed in the pilot line 22. In other applications of the invention, the pressure transducer could be coupled to or located near the flowmeter 44 in the outlet line. The pressure feedback signals are processed to alarm a need for filter changes when the water pressure reaches a lower limit of 8 psig and to generate ON/OFF control signals for the pressure booster pump 43.

The flowmeter 44 is provided mainly to enable total water flow to be detected as a monitor for the ion exchange chamber 41. A total water volume setpoint is entered as a programmable alarm during system setup on the basis of the resin selected for use in the ion exchange chamber 41. Total water volume is also accessible for use in estimating beverage sales where the user/owner of the apparatus 62 is a restaurant or other merchant, and in estimating results of chemical water analysis (amount of undesirable chemicals present such as those causing excessive alkalinity or hardness).

The low-cost UV intensity sensor 93 continuously monitors the effectiveness of the UV treatment if the UV chamber 42 is included in the apparatus 62. Audible and visual alarms are activated by the main control-box microprocessor when UV intensity falls below a lower limit or lamp burnout occurs.

The UV intensity sensor 93 is preferably located outwardly of a tubular water flow path in the UV chamber 42 so that the UV radiation passes through the water from a centrally located lamp before it is measured.

Figure 7A:
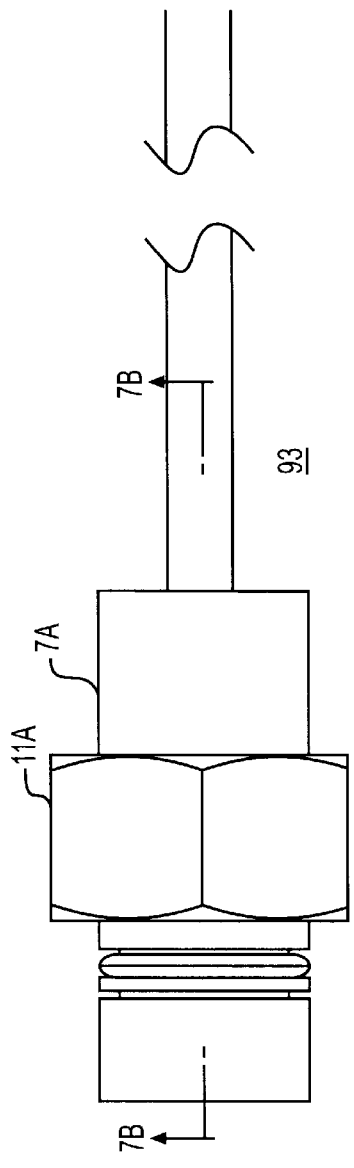
FIG. 7A is a plan view of an ultraviolet (UV) sensor which enables monitoring of a UV module includable in the modularly organized water treatment apparatus of the invention.
Figure 7B:
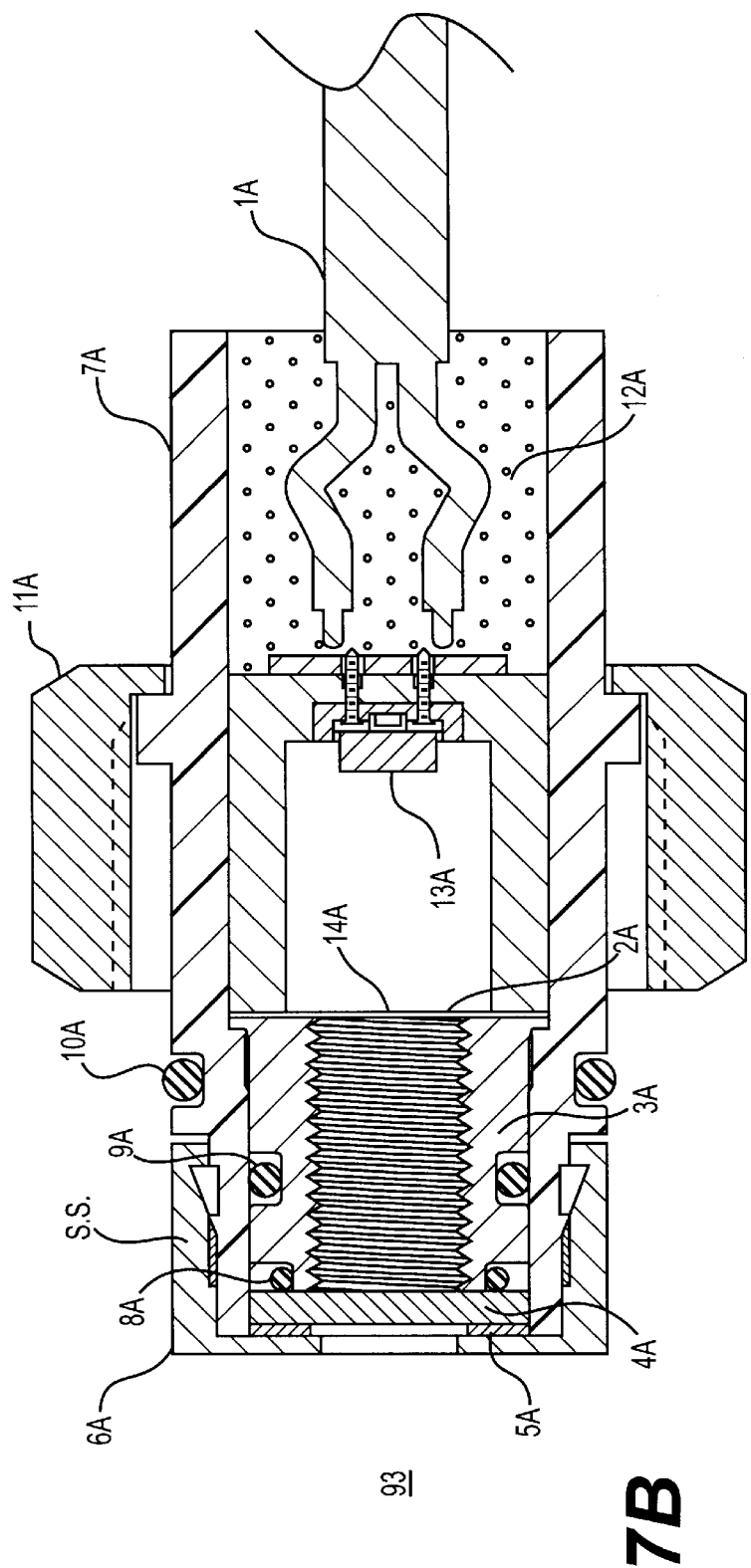
FIG. 7B shows a longitudinal section taken along the reference line shown in FIG. 7A.
Figure 7C:
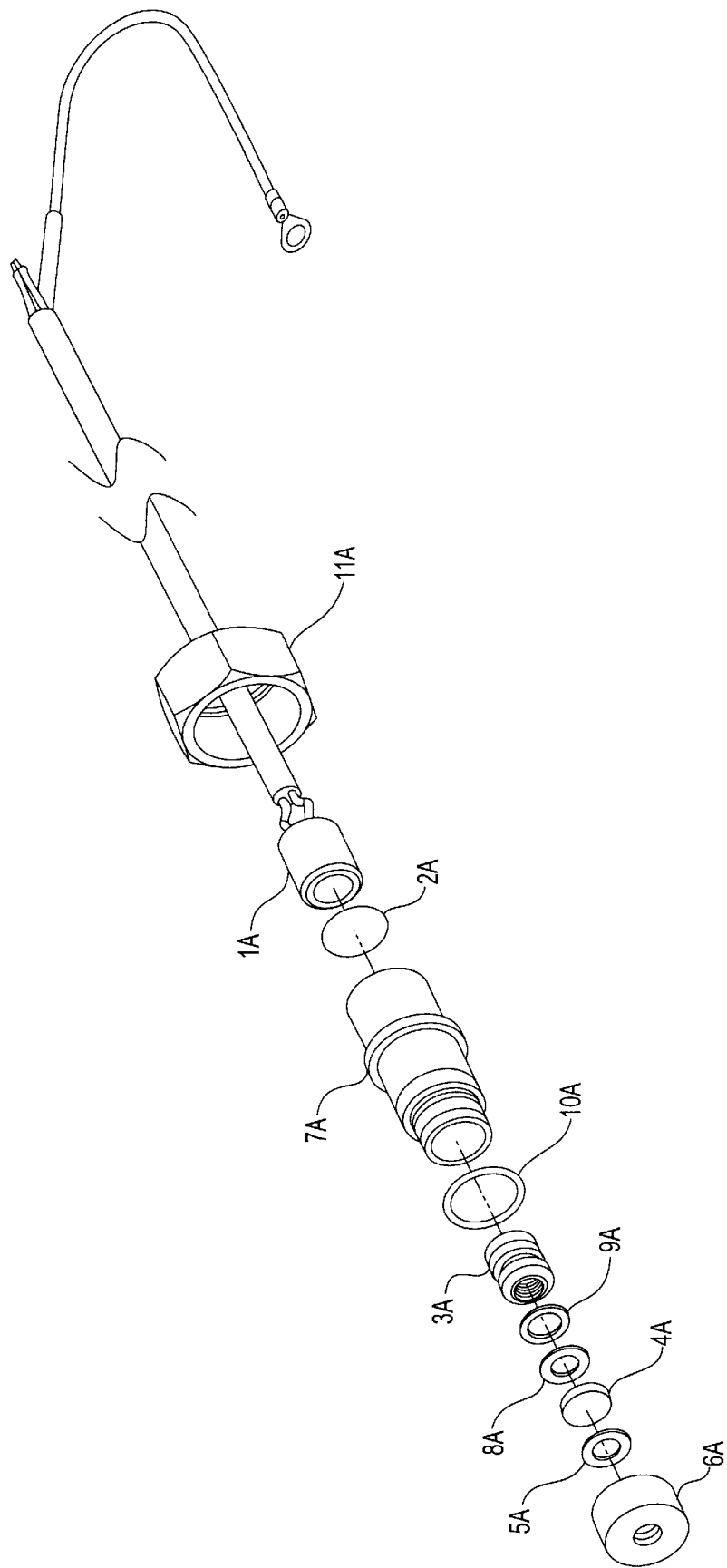
FIG. 7C is an assembly diagram of the UV sensor of FIG. 7A.

As shown in FIGS. 7A–7C, the UV sensor 93 has a housing 7A which is secured to the UV chamber 42 by a nut 11A. The housing 7A is preferably formed from plastic whereas other structural parts are preferably formed from stainless steel. This arrangement significantly reduces manufacturing costs substantially without affecting quality of performance.

Within the housing 7A, a UV diode 13A is supported to receive UV radiation through an opening 14A. The diode 13A senses the intensity of the UV radiation and transmits an electrical signal through its terminals to electrical connectors to the control box 45. FIG. 7C illustrates the manner in which all of the sensor parts are assembled to form a completed unit.

Control Box

Circuitry shown in FIGS. 5A–5I operates in the control box 45 to monitor and control the water treatment apparatus 62. A power supply system receives input power through a connector 122. The supply voltage is applied directly to a UV ballast line through connector 124 and to a transformer 126 for downconverting.

A sidactor 128 suppresses any surges in a 12V output from a secondary of the transformer 126. A bridge rectifier 130 rectifies the AC voltage to provide a 12V DC output 132 for use in powering certain circuitry in the control box 45.

The rectifier output is also applied to a voltage regulator 134 which, along with associated capacitor and diode circuitry, generates a 5V DC signal VCC at terminal 136 for use in powering digital circuits in the control box 45.

Another bridge rectifier 138 rectifies the source AC voltage to generate a DC voltage for powering the booster pump 43 through a connector 140. A relay 142 operates as an ON/OFF switch for the operation of the pump 43, and it is controlled by a microcontroller booster-pump signal 144 amplified by an amplifier circuit 146. Subsequent text herein presents more detail on booster pump control.

Figure 5A:
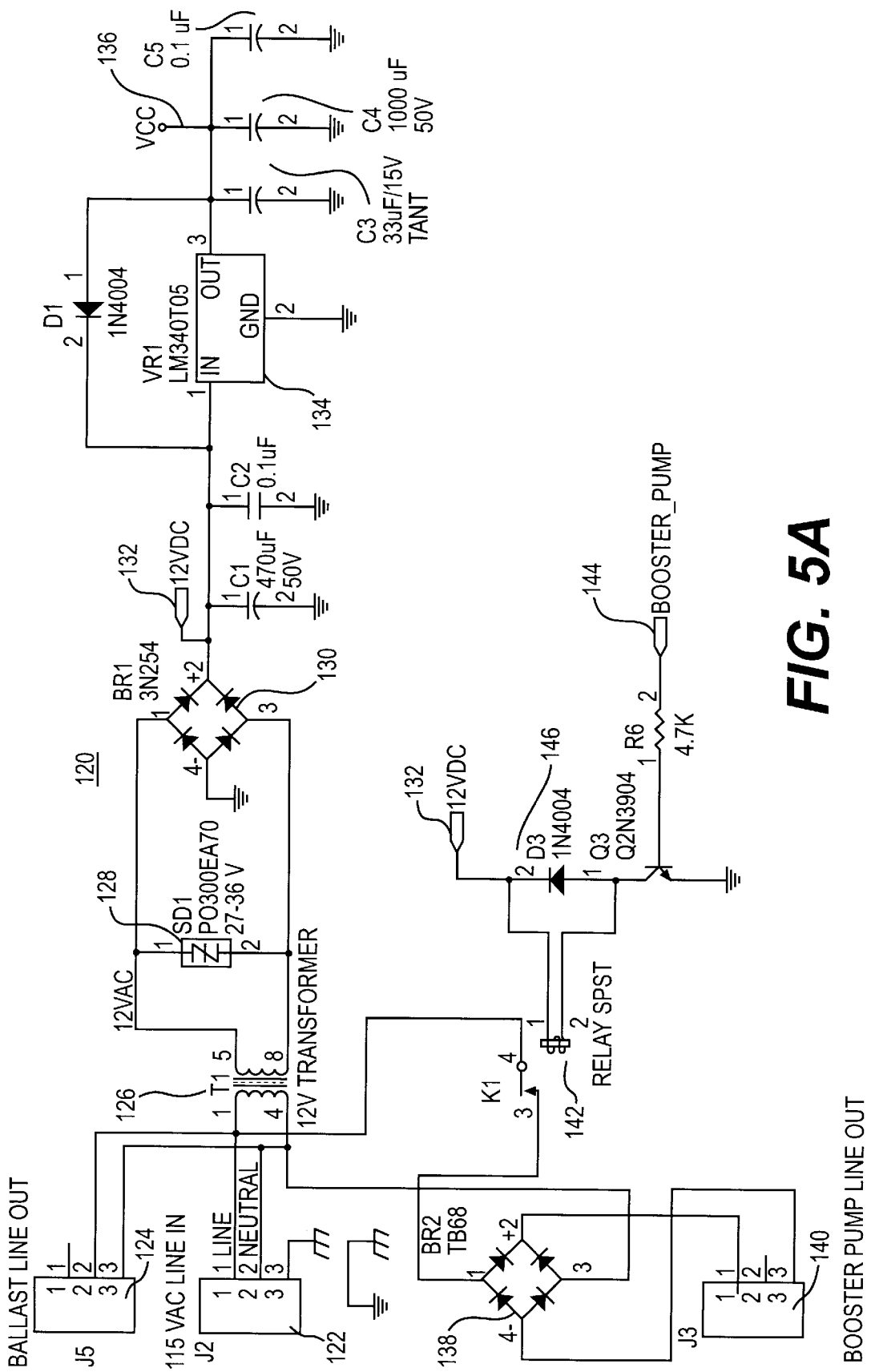
FIGS. 5A–5I are schematic diagrams representing various circuits located in a control box of the water treatment apparatus of FIGS. 1 and 2 and provided for monitoring and control of this apparatus.
Figure 5B:
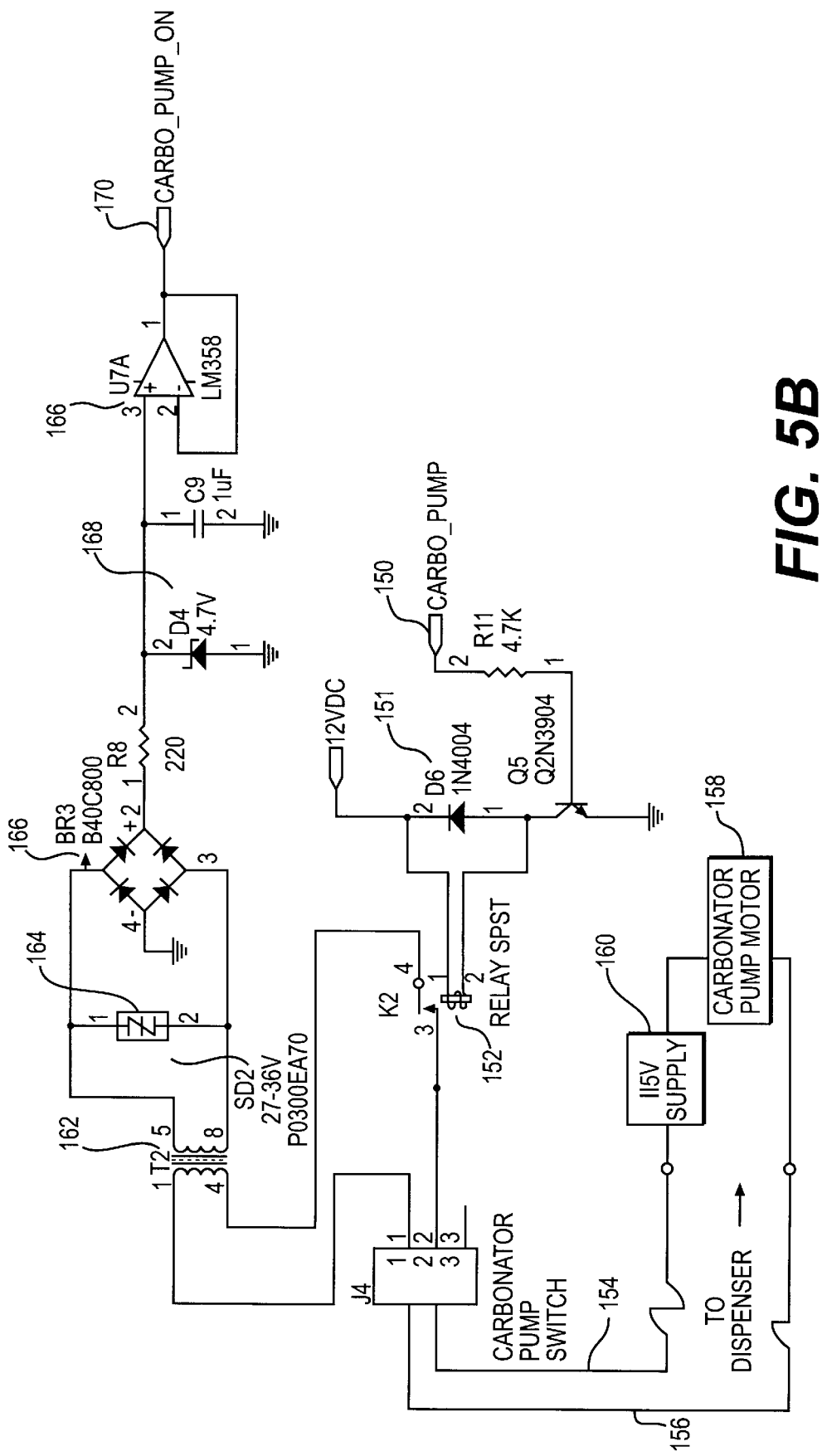

Circuitry shown in FIG. 5B provides carbonator pump ON/OFF control. A microcontroller signal 150 is amplified by an amplifier circuit 151 to operate an ON/OFF relay 152. Connection wires 154 and 156 extend to the dispenser where connections are made to a carbonator pump motor 158 through a power supply 160.

When the relay 152 is switched ON, the motor 158 is placed in operation, and the flow of motor current energizes the primary winding of a feedback downconverting transformer 162. A sidactor 164 suppresses voltage surges in the output from the transformer secondary prior to rectification by a bridge rectifier 166.

The rectifier output is applied to an operational amplifier 165, with input voltage regulation provided by diode and capacitor circuitry 168. A digital level output signal 170 operates as a microcontroller input which confirms carbonator pump energization.

Figure 5C:
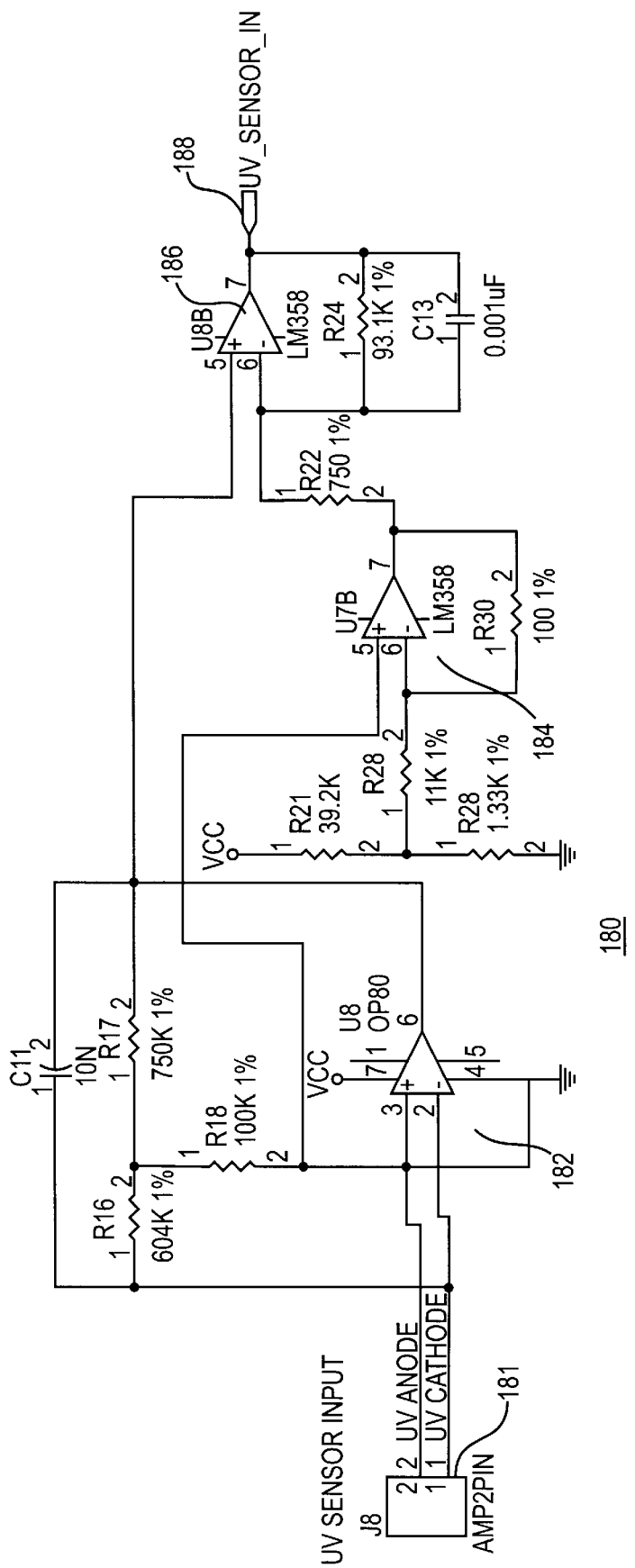
Figure 5D:
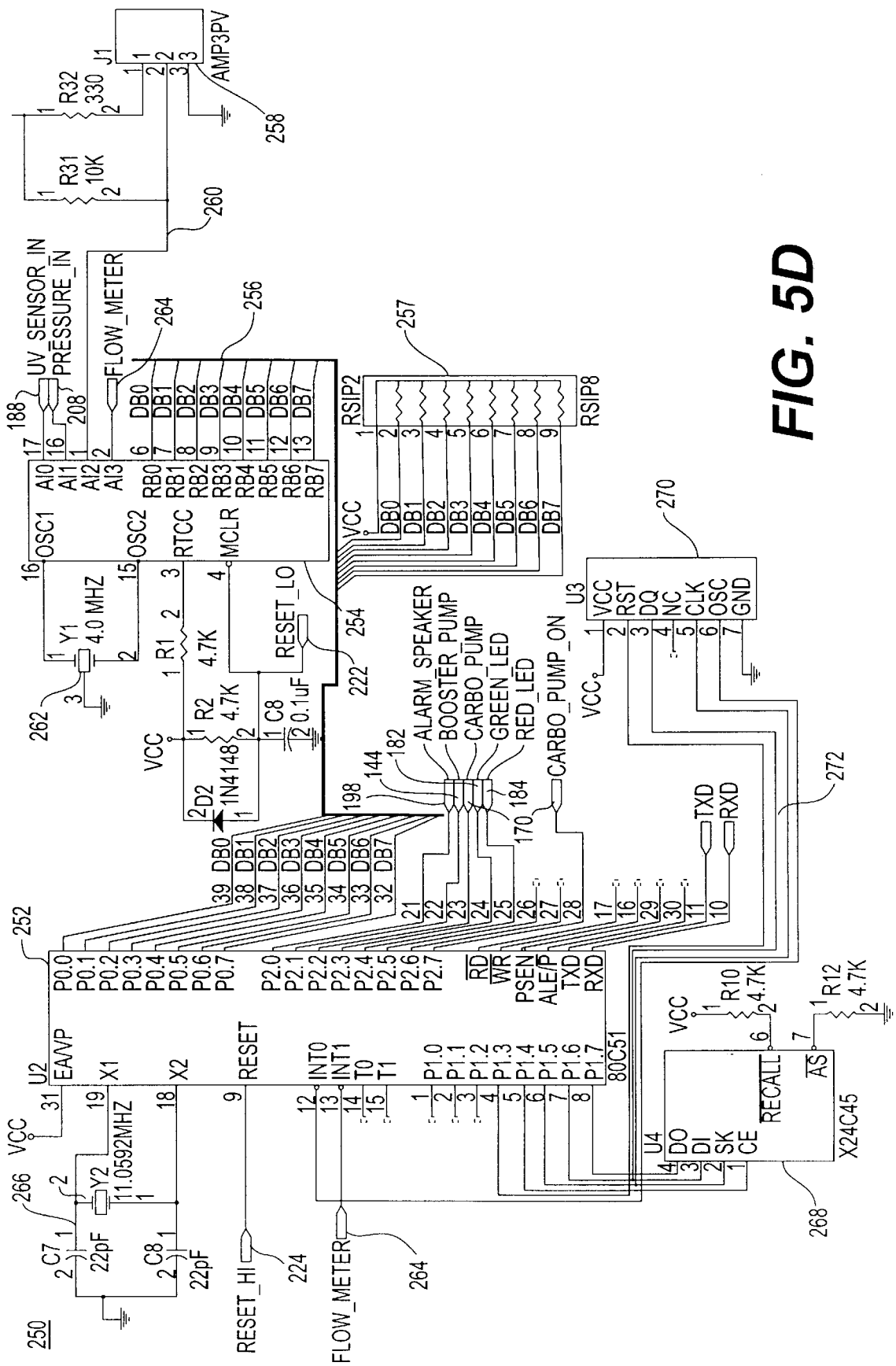
Figure 5E:
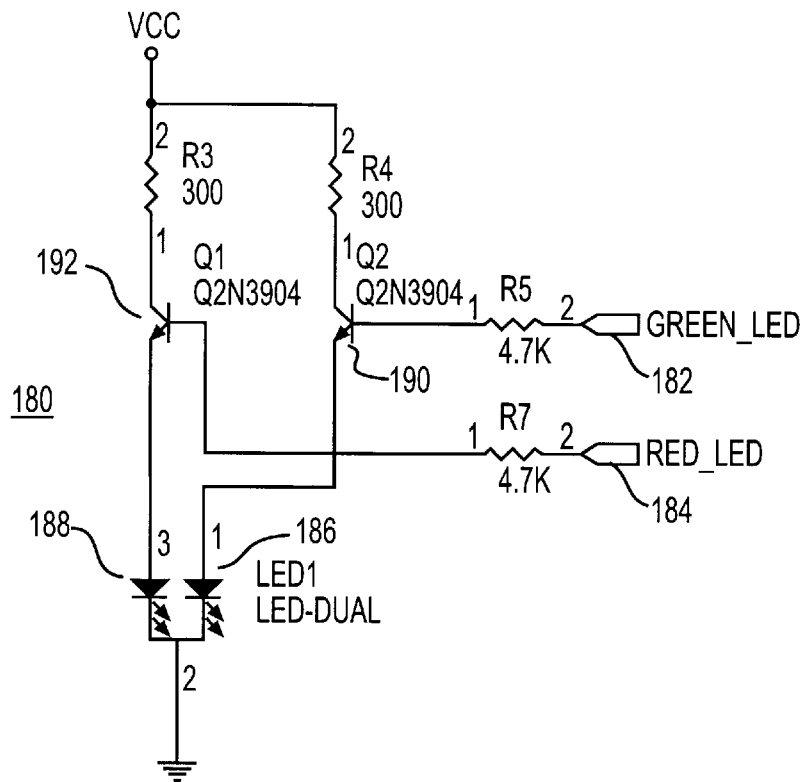
Figure 5F:
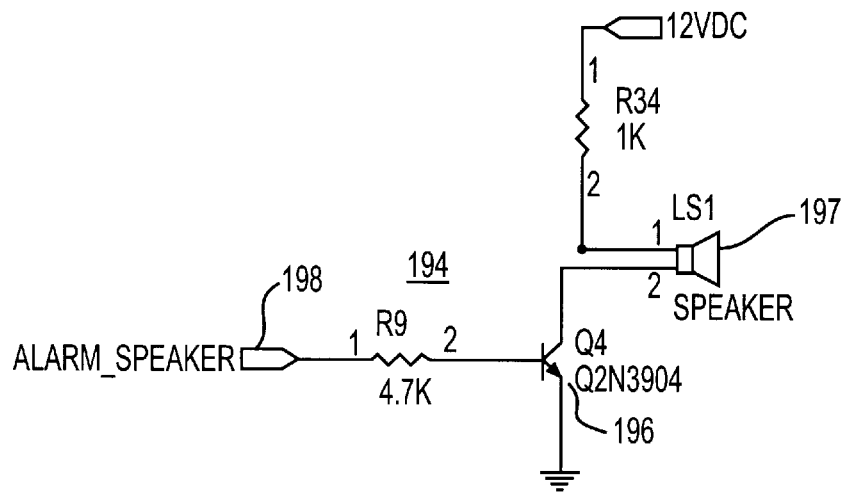

In FIG. 5C, a circuit 180 receives a low voltage, anode/cathode feedback signal through a connector 181 from the UV sensor 93, and processes this signal for micrcontroller input. The UV sensor signal is amplified by a first-stage differential amplifier circuit 182, then by a second stage operational amplifier circuit 184, and finally by a third stage operational amplifier circuit 186. An analog UV sensor feedback signal 188 is output at a voltage level such as 3 or 4 volts for microcontroller input.

An alarm circuit 180 (FIG. 5E) responds to microcontroller alarm signal 182 (green) or microcontroller alarm signal 184 (red) to energize the control box green indicator lamp 186 or the red indicator lamp 188. If both alarm signals are generated at the same time, both lamps 186 and 188 are energized, and, since the lamps are mounted side by side, yellow light is projected to a viewer. Respective semiconductor amplifier/switches 190 and 192, when actuated by the signal 182 or 184, energize the indicator lamps 186 and 188 from the voltage source VCC.

Cyclic generation of the alarm signals 182 and/or 184 causes lamp flashing. As previously indicated, normal system operation causes only the green lamp to be lit. A generated warning alarm causes both the green and the red lamps to be lit thereby generating yellow light. A generated disabling alarm causes only the red lamp to be lit. The priority table in APPENDIX C provides a classification of the suggested various alarm conditions.

A sound alarm circuit 194 (FIG. 5F) employs a solid state amplifier/switch 196 to energize a speaker 197 from the 12V DC voltage source when a microcontroller sound alarm signal 198 is received. The speaker 197 emits a buzzer sound when energized.

Figure 5G:
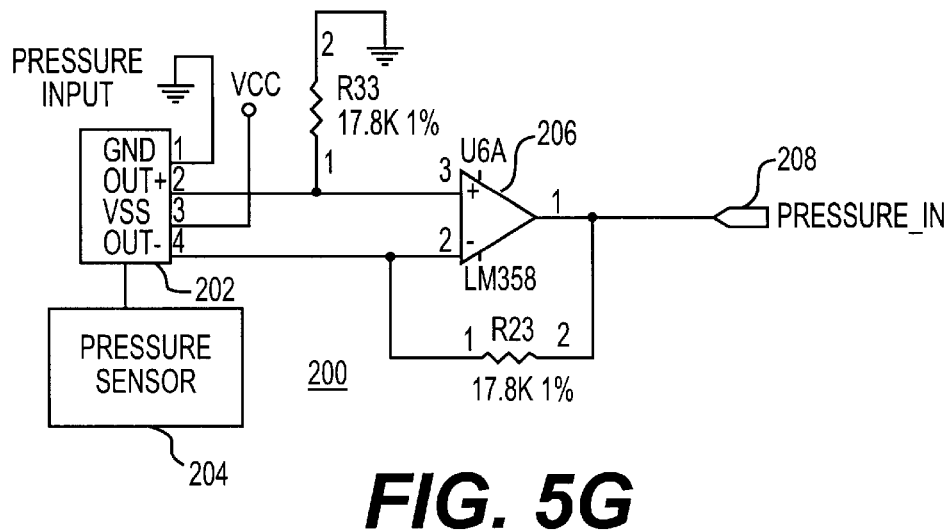
Figure 5H:
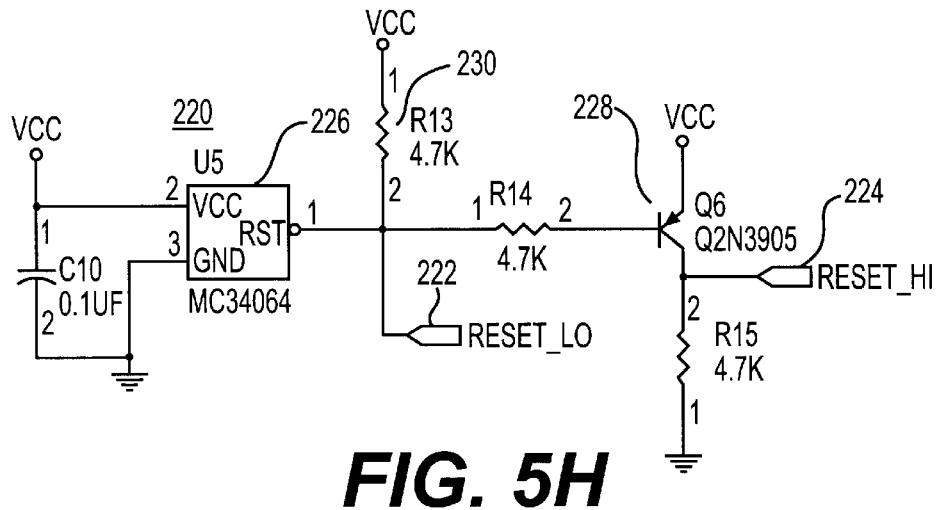

A pressure feedback processing circuit 200 is shown in FIG. 5G. A feedback water pressure signal is received through an input connector 202 from a pressure transducer 204 located on a control board in the control box 45. A differential amplifier circuit 206 amplifies the pressure signal to produce a microcontroller input signal 208.

A microcontroller reset circuit 220 (FIG. 5H) generates a binary LO reset signal 222 for the support microcontroller 254 (FIG. 5D) or a binary HI reset signal 224 for the main microcontroller 252 if the value of the voltage source VCC drops below its lower threshold value. A conventional semiconductor voltage detector chip circuit 226 responds to a VCC input 228 to generate an output at the VCC voltage level if the VCC voltage level is above the threshold value.

If the VCC voltage level drops below the threshold value, the detector circuit 226 outputs a ground level potential. The RESET-LO signal is then generated, and a semiconductor switch 224 is operated to output the RESET-HI. If the VCC voltage level returns to a value above the threshold, the reset signals are ended, thereby allowing the microcontrollers to resume operation. The microcontrollers respond to reset signals as more fully described subsequently herein.

A plug connector 240 (FIG. 5I) is provided for interfacing the hand-held controller 100 with the circuitry in the control box 45. Pin 2 supplies power to the controller 100, while pins 4 and 5 respectively provide data transmission TXD and data reception RXD to and from the hand-held controller 100.

A microcontroller system 250 (FIG. 5D) receives feedback signals and operates under program control to generate control commands and to generate system alarms. Preferably, the system operates on a computational load sharing basis, and thus includes a main microcontroller 252 and a support microcontroller 254 which preprocesses feedback signals for application to the main microcontroller 252, primarily through an 8-bit data bus 256.

The flowmeter 44 (FIG. 2) is connected to an amplifier 258 which generates an analog water flow signal 260 for input to the support microcontroller 254 through input pin 1. The analog UV sensor and water pressure signals 208 and 188 are input the support microcontroller 254 through respective pins 17 and 18. An internal analog-to-digital converter system converts the analog signals 188, 208, and 260 to digital signals for computer processing.

A resonator clock 262 generates a clock signal which is coupled to input pins 15 and 16 of the support microcontroller 254 to control its cyclic operation. Normally, the microcontroller 254 receives power from the source VCC through pin 3.

If the source voltage VCC becomes too low, the RESET-LO signal 222 (a low or zero binary signal) is applied to input pin 4 of the microcontroller 254. A reset operation then occurs, and the reset is held until the triggering condition is corrected. After correction, the microcontroller is restarted to a state in which it waits for a command from the main microcontroller 252.

In operation, the support microcontroller 254 converts feedback pressure and UV analog signals to digital values which are held until requested by the main microcontroller 252. The input flow meter signal 260 is a pulse train which has a pulse frequency dependent on the water flow rate through the water treatment apparatus 62. The microcontroller 254 tracks the water flow units, preferably ten-gallon units, and transmits each the signal 264, for each water unit, directly to an interrupt input at pin 13 of the man microcontroller 252.

The support microcontroller 254 outputs data over the data bus 256 to input pins 39 through 32 of the main microcontroller 252. A block 257 represents a conventional pullup resistor pack for the data bus 256. In the main microcontroller 252, the carbonator pump-on signal 170 is applied to input pin 28, and pins 11 and 10 are used respectively to transmit and receive data to and from the hand-held controller through the connector 240. If the carbonator pump-on signal 170 is not present during installation, the water treatment apparatus 62 is disabled from starting until the necessary connections are established to energize the carbonator motor and thereby generate this pump feedback signal.

The RESET-HI signal 224 is generated as a "1" or high binary signal as previously described, and, when generated, is applied to input pin 9 of the main microcontroller 252. The main microcontroller 252 then resets, holds, and restarts in a manner similar to that described for the support microcontroller 254. On reset, current in-process data is lost, but all important data, including, at least, user set parameters, needed for restart is automatically saved to an external nonvolatile memory 268. On restart, the saved data is recalled by the main microcontroller 252.

A crystal clock 266 is coupled to input pins 18 and 19 to control the cyclic operation of the main microcontroller 252.

In turn, the microcontroller 252 generates a clock signal at output pin 6 which is connected to the external memory 268 and to an external elapsed time counter 270 to synchronize the external units with the main microcontroller 252.

The elapsed time counter 270 continuously counts seconds after it has been initialized by the main microcontroller 252. The microcontroller communicates serially with the counter via a serial line (counter pin 3) and a clock line (counter pin 5) and a reset line (counter pin 2). When an event occurs (filter installation, UV lamp installation, or ion chamber installation), the main microcontroller reads the current second count from the counter 270 and saves the calculated day (seconds divided by 86,400) in the nonvolatile memory. The microcontroller also saves the start date when the system was installed.

The microcontroller reads the time counter 270 at regular intervals and calculates the current day (seconds divided by 86,400). It then compares this current day with all the start days recorded as read from the nonvolatile memory to determine the elapsed time since each item was installed or reset. The main microcontroller then compares these elapsed times with their appropriate periods and, if any have surpassed their allowable periods, the appropriate alarm is set.

The main microcontroller 252 operates under stored program control to process various inputs and generate output alarm and control signals. Specifically, the output signals include the speaker and lamp alarm signals 182, 184, and 198 and pump control signals 144 and 170.

Programmed Computer Operation

Figure 5I:
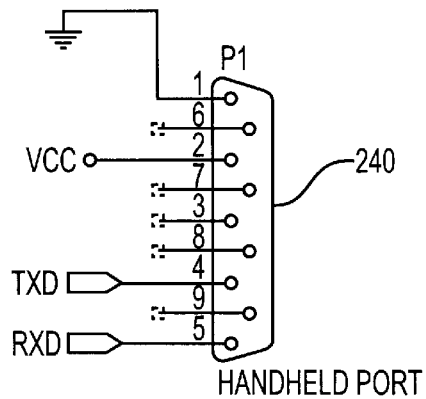
Figure 5J:
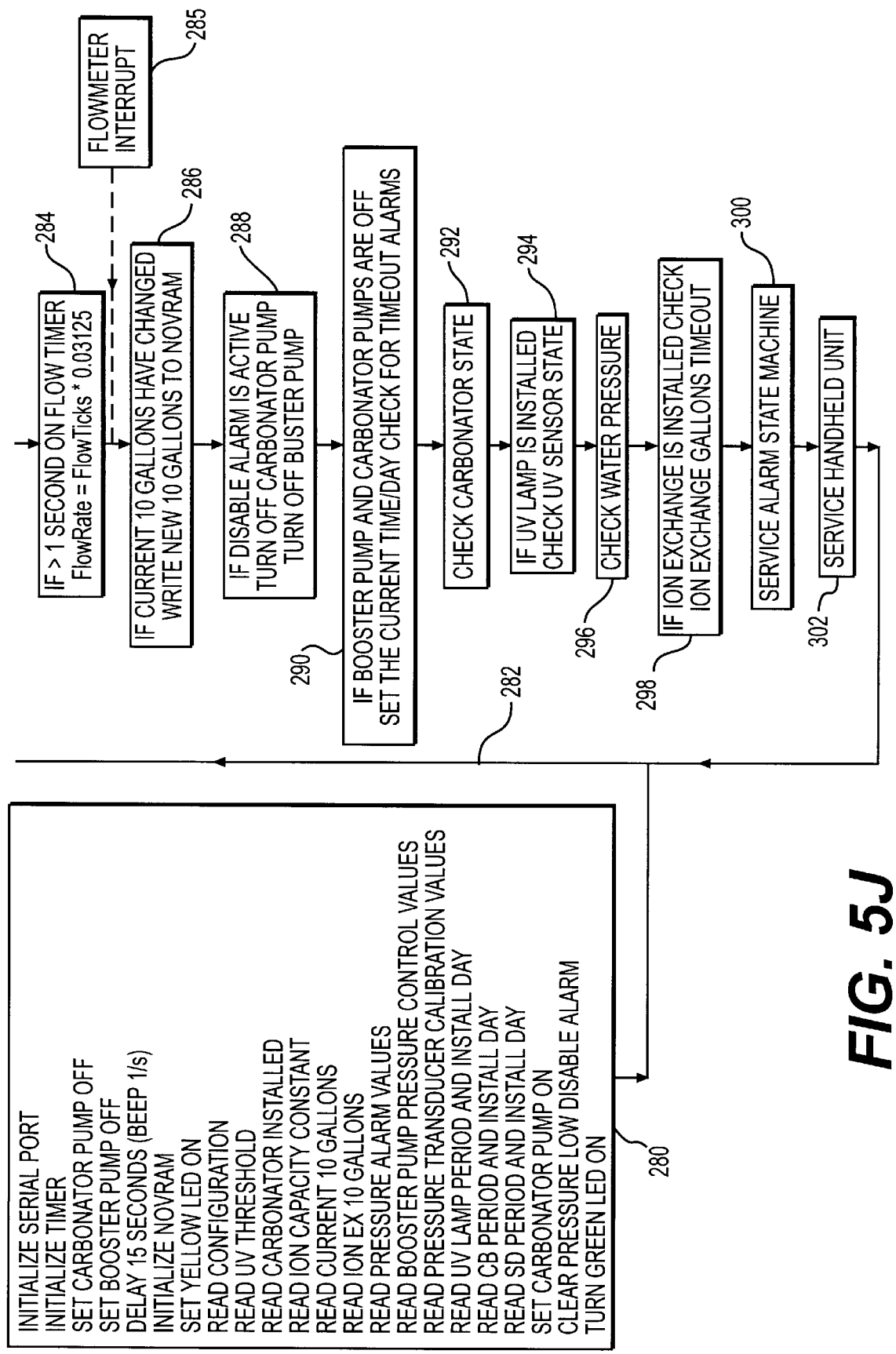
FIG. 5J is a logic flow diagram for a microcontroller employed in the water treatment apparatus of FIGS. 1 and 2.

When the microcontroller is first powered, initialization is performed as indicated in functional block 280 (FIG. 5J). Various data values are read from memory, such as apparatus configuration, UV threshold, etc., and various commands are executed as indicated in the block 280.

Program loop 282 is then entered for cyclic execution of the procedures included therein. In block 284, the water flow rate is computed from the number of water flow units per minute or other unit of time, and held for read commands from the hand-held controller 100. As previously indicated, the input flow signal 260 comprises successive pulses or ticks representing successive measured units of output water flow, and, in this embodiment, these measured units are combined to form a representation of ten-gallon units of flow.

Block 285 generates a main microcontroller interrupt, as indicated by dotted line 287, for each new flow meter pulse.

In block 286, a new ten-gallon count is written for addition to a total flow count stored in nonvolatile RAM memory if the system has counted a new unit of tens of gallons.

If a disable alarm is active, commands are issued to turn off the booster and carbonator pumps as indicated in block 288, just in case external circuitry has not already done so. If these pumps are turned off, timeout alarms are checked as indicated by block 290. Timeout alarms are checked by reading elapsed time for each timeout alarm from the elapsed time counter 270.

As shown in block 292, the state of the carbonator is checked by checking the state of the feedback signal 170.

During apparatus installation, a warning alarm is generated until the feedback signal indicates that the carbonator pump is ON, as previously described.

As indicated by block 294, the state of the UV lamp is checked from the UV intensity feedback input. If the UV intensity is low, an alarm is generated.

The feedback water pressure value is checked, as indicated by block 296, to determine whether a low pressure alarm should be generated and to provide for active control of the water pressure by providing ON/OFF cycling control of the booster pump 43.

Figure 5K:
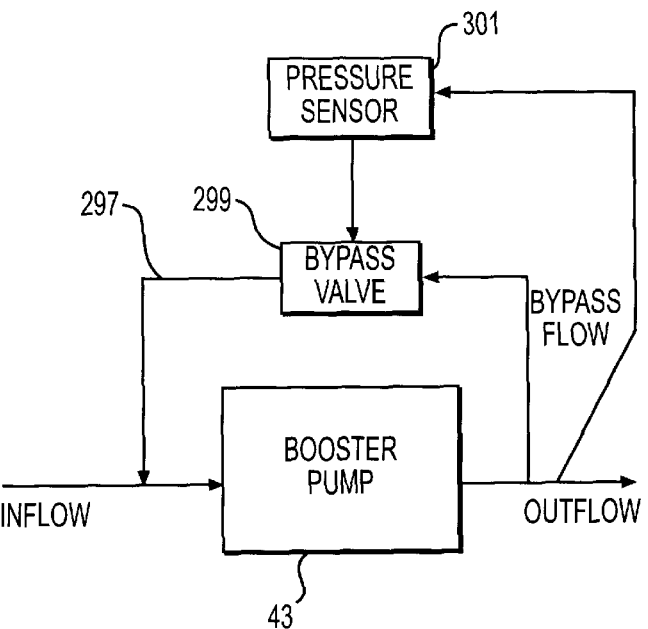
FIG. 5K is a schematic diagram for explaining the booster pump and the bypass water flow operation.

When demand occurs for water output to the carbonator pump, the water treatment apparatus 62 outputs water to the dispenser, and booster pump and carbonator pump flows are normally balanced by controlled bypass water flow 297 (FIG. 5K) from the output of the booster pump to the booster pump input.

A mechanically controlled valve 299 responds to an outlet pressure from the booster pump 43. System water flow is thus balanced even though the booster pump has a greater flow capacity than that of the carbonator pump. At the same time, the bypass flow restricts water pressure buildup during ON time of the booster pump.

The main microcontroller 252 executes ON/OFF cycling control of the booster pump 43 according to determinations made in the block 296. If the water pressure is below a stored low setpoint value, such as 50 psi, the booster pump is turned ON. The booster pump remains ON until the water pressure value reaches a stored high setpoint value. The booster pump is then turned OFF. During the ON time of the booster pump, some water pressure regulation occurs as a result of the bypass flow as described above.

In block 298 of the program loop 282, the ion exchange timeout is determined from the elapsed time counter 270 if the ion exchange chamber 41 is included in the water treatment apparatus 62. When the expected resin life is reached, an alarm is generated.

Next, in block 300, an alarm state machine is serviced. In other words, alarms generated as a result of program loop operation are registered in a stored alarm priority table corresponding to the table shown in APPENDIX C. At any one time, one or more warning or disabling alarms may exist.

If multiple alarms coexist, it is preferred that only the highest priority alarm be displayed. When a displayed alarm is cleared, the next lower priority alarm is displayed. The priority status of the alarms descend through the registered disabling alarms and then through the registered warning alarms. The entire alarm priority table is also accessible on commands from the hand-held controller 100 to provide a readout of the status of any of the conditions which can be alarmed.

Finally, block 302 provides servicing of commands from the hand-held controller 100. Thus, parameter setpoints may be set by RXD data from the hand-held controller 100, or data may be read from the main microcontroller 252 and transmitted to the hand-held controller 100 as TXD data. More detail is presented on this control interface in the next section.

Hand-Held Controller

The hand-held controller 100 (FIG. 6A) provides a control interface which enables a user to perform various operations including system startup and replacement procedures, system status monitoring, expected ion resin life computations, and setting threshold values for alarms.

The unit 100 plugs into the connector located on a side of the control box 45, and after the connection is made, the hand-held displays one of the top level menus called STATUS. This indicates that the hand-held controller 100 is ready for use.

The hand-held controller 100 has two operating modes, the menu system and the edit mode. In the menu mode, the hand-held unit 100 is used to move from one menu to another, and, in the edit mode, some parameters and threshold values of the system can be entered and/or changed. When the hand-held unit 100 is first plugged in, it is always in the menu mode. Buttons and their functions are as follows:

| Button | Function |
| --- | --- |
| Menu Mode | |
| menu 101 | scrolls through the current level of menus. |
| reset 102 | backs out to the previous menu without executing any instructions. |
| enter 103 | selects a sub-menu to enter. |
| Edit Mode | |
| up arrow | increases the selected digit (flashing) by one or selects the Yes or No option |
| down arrow | decreases the selected digit (flashing) by one or selects the NO option |
| left arrow | moves cursor to edit digit to the left from the current position |
| right arrow | moves cursor to edit digit to the right from the current position |
| set 104 | saves the new value |
| reset 102 | exits the edit digit command without making any changes. |

Menu structures and the available selections for each of the main menus (STATUS, NEW, and SETTING) are presented in the following tables:

| STATUS | | NEW | SETTING |
| --- | --- | --- | --- |
| Warngs? | | New Sys? | CB Days? |
| Alarms? | | New Cig? | SD Days? |
| Time | | | CIG UV? | PSI ALM? |
| | [T lamp?] | CIG BP? | PSI WRN? |
| | T CBf? | CIG IE? | [BP ON?] |
| | T SDf? | [NEW CAP] | [BP OFF?] |
| | [T IonEx?] | C = from unit | [UV Snsr?] |
| | T Systm? | Alka 246 | |
| Gallons | | Hard 204 | |
| | G CBf? | Chio 060 | |
| | G SDf? | Sulf 100 | |
| | [G IonEx?] | Nitr 010 | |
| | G Systm? | Temp 080 | |
| W Flow? | | Flow 1.7 | |
| W Press? | | Resi 0.5 | |
| [UV Snsr?] | | Bypa 00 | |
| F/W Ver | | C-Calculated | |
| | | [New Lmp?] | |
| | | New CBf? | |
| | | New SDf | |
| | | [New Ion?] | |

[ ]—denotes optional menu depending on a configuration settings of the unit

In the STATUS menu, all warnings, alarms, and operational status of the system can easily be accessed and viewed. In addition, software version used in the system is also accessible for reference. Some of the submenus are only available if the particular treatment module is present. For example, the "T IonEx" selection under "Time" submenu, and the "G IonEx" under "Gallons" submenu are only present if the system is equipped with the ion exchange stage.

The "Warngs" submenu shows the current status of the system warnings. As described above, all warnings work on a priority system so that the highest priority is only displayed. The warnings format is:

| U | UV lamp sensor |
|---|---|
| P | Water pressure low |
| C | Carbon block filter time out |
| S | Sediment filter (prefilter) time out |
| I | Ion exchange 90% spent |
| N | No carbonator pump cut-off installed |
| B | Booster pump timeout |

The "Alarms?" submenu shows the current status of the disabling alarms. As described above, all alarms work on a priority system, so that the highest priority is only displayed. The alarms format is:

| U | UV lamp sensor alarm |
|---|---|
| P | Water pressure low |
| C | Carbon block filter time out |
| S | Sediment filter time out |
| I | Ion exchange 100% spent |
| B | Booster pump off after 4 warning alarms |

The "Time" submenu shows the time in service since new or a replacement installation for the following parts of the system: UV lamp ("T Lmp" submenu selection), carbon block filter ("T CBf?" selection ), prefilter ("T SDf?" selection), ion exchange ("T IonEx" selection), and the entire system since installation date ("T Systm" selection). The "Gallons" submenu displays the volume of water (in gallons) that passed through the carbon block filter ("G CBf?"), prefilter ("G SDf?"), ion exchange ("G IonEx?"), and the system ("G Systm?") since the last new installation or reset.

The submenus "W Flow?", "W Press?", "UV Snsr", and "F/W Ver." display current flow rate, water pressure, UV sensor value, and software version respectively. Software versions may be the original software or a subsequent update.

The NEW menu is used during initial installation of the system, when replacing spent components, resetting some of the warning and disabling alarms, adding new treatment modules, and inputting chemical analysis results into the system to compute an approximate service life of the ion exchange module. The "New Sys?" submenu when installing a new system for the first time. It sets all defaults for the system parameters and sets the system configuration as a full system (assumes that all modules, including booster pump, are installed). If the system being installed is not a full system, the next submenu, called "New Cfg?" must be used to indicate to the control box 45 what the system configuration is.

The "New Cfg?" submenu is only used when the system being installed is not in the full configuration, or when adding or removing treatment modules in an existing installation. Under this submenu, UV module ("CfG UV?" selection), booster pump ("CfG BP?" selection) or ion exchange (:CfG IE?" selection) can be added or removed. For example, to remove UV module, the "Cfg UV?" is selected and the enter button is pressed. The display then shows "UV=yes". The down arrow is pressed to change the display to "UV=no" and the set button is used to save The "New Cap" submenu is only used to input water parameters to computer expected life of the ion exchange resin. These parameters are alkalinity, hardness, chlorides, sulfates, nitrates, water temperature (deg. F), water flow rate (gallons per minute), volume of the resin, and bypass factor. The default values for this submenu are:

| "Alka 246" | alkalinity 246 ppm (parts per million) |
|---|---|
| "Hard 204" | hardness 204 ppm |
| "Chlo 060" | chlorides 60 ppm |
| "Sulf 100" | sulfates 100 ppm |
| "Nitr 010" | nitrates 10 ppm |
| "Temp 080" | water temperature 80 deg. F. |
| "Flow 1.7" | water flow rate of 1.7 gal. per min. |
| "Resi 0.5" | volume of the ion exchange resin 0.5 cu. ft. |
| "Bypa 000" | 0% bypass through ion exchange tank |
| "C=000630" | 630 Gal. computed resin capacity before regeneration needed |

The input new values of the "New Cap" submenu, the arrow and set buttons are used in the manner previously described. After all new values for the ion exchange module are stored, the new resin capacity is computed. The capacity selection "C=. . . l" shows the new value. To save this value, the set button is pressed. After saving, the newly computed capacity becomes a setpoint for the ion exchange alarms.

The "New Lmp" submenu is only displayed if the treatment system includes the UV module. This submenu is accessed every time a new UV lamp installed. The enter button may be pressed when the submenu is shown on the display. The screen then reads "RU Sure" and the set button is hit to confirm that a new UV lamp has been installed in the system.

The "New CBf?", "New "SDf?", and "New Ion?" submenus work in a manner similar to that of the "New The "New CBf?", "New "SDf?", and "New Ion?" submenus work in a manner similar to that of the "New Lmp?" submenu. "New CBf?" and "New SDf?" inform the system of carbon block and prefilter changes and are always available. "New Ion?" indicates that the ion exchange resin tank has been replaced, and is only used when the system has the ion exchange module included in the system configuration.

The SETTING menu allows changing of the default system threshold settings for disabling alarms and warnings. Up to seven submenus are available depending on the treatment system configuration.

"CB Days?" and "CD Days"? submenus give access to the service period settings for the carbon block and prefilter elements, respectively. The default value is 183 days for each type of filter. If a change is desired, the period should be set for less than the default value.

The "PSI ALM?" and "PSI WRN?" submenus allow pressure settings to be changed for the low water pressure disabling and warning alarms. Defaults are 10 psig and 20 psig (both flowing) for disabling and warning alarms respectively. These values should not be changed without the benefit of factory consultation.

The "BP ON?" and "BP OFF?" submenus give access to the booster pump on/off settings. Default values are 50 psig and 65 psig for the on and off conditions respectively.

The "UV Snsr?" submenu sets a value for the UV lamp low intensity alarm. The default value is 83 and should not be changed without factory consultation.

Figure 6B:
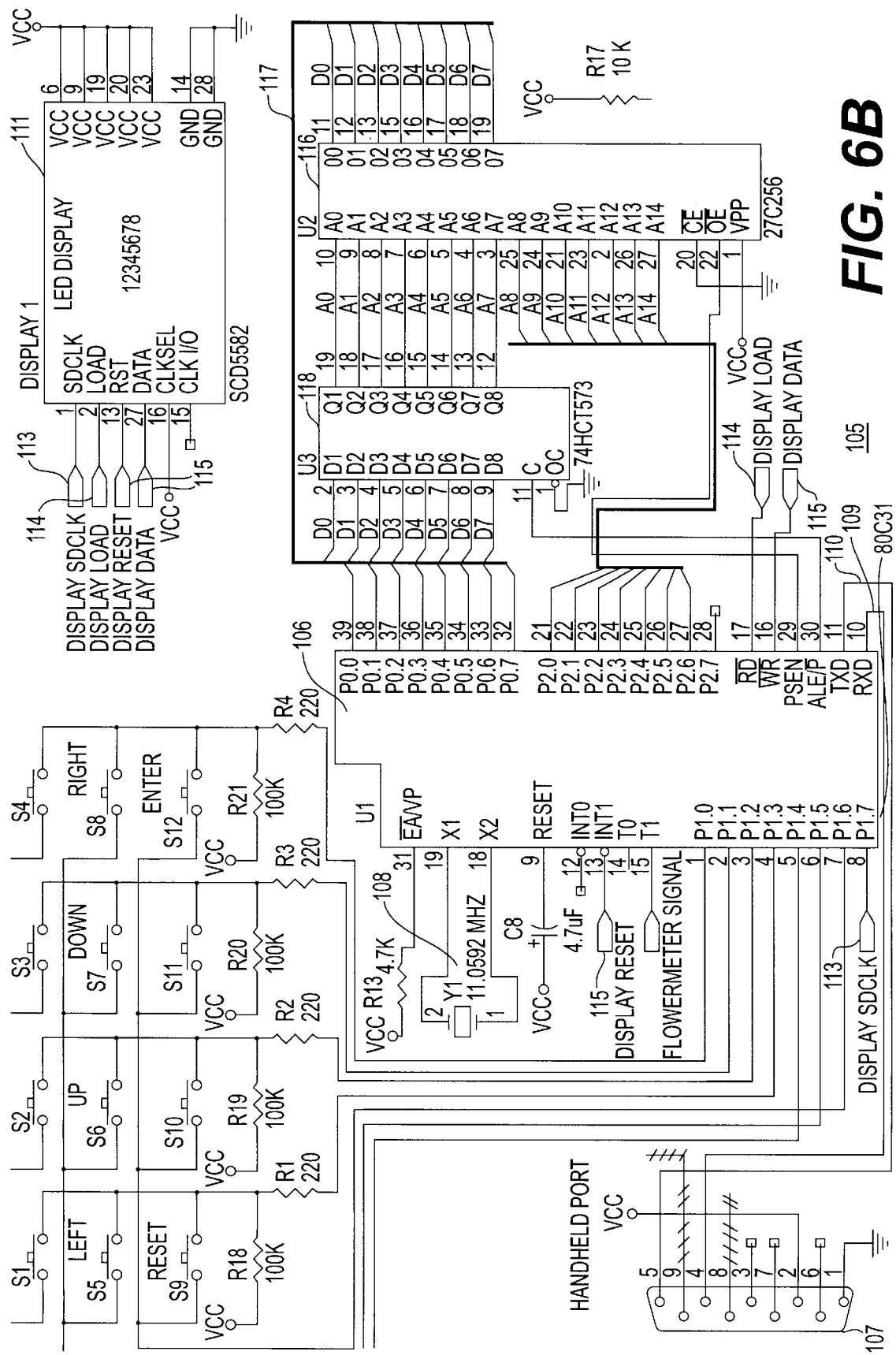
FIG. 6B schematically illustrates circuitry preferably employed in the hand-held controller.

Circuitry 105 (FIG. 6B) in the controller unit 100 performs the described controller functions. The described buttons operate corresponding ON/OFF switches as shown in the upper lefthand corner of FIG. 6B. These switches are connected as inputs to a microcontroller 106. Power is supplied to the circuitry 105 from the source VCC when a plug connector 107 is plugged into the control box connector 240 (FIG. 5I).

A crystal oscillator 108 is coupled to an input of the microcontroller 106 to control its cyclic operation. TXD and RXD connections are made to the main control box microcontroller through the connector 107 for data interchange as previously described.

If a key entry requests editing of entry data, the editing is performed, as indicated by block 336, and the edited value is displayed at block 332. The next keypress is then awaited at block 334.

If the entry key is pressed to send a data request or parameter command or installed device message to the control box 45, the message is formed and sent to the control box 45 as indicated by block 338. An acknowledgement, confirmation, or data message is then awaited from the control box 45, and, when received, a corresponding display is generated at block 332 before a return is made to the keypress wait state at block 334. APPENDIX D provides a list of preferred commands all of which can be sent from the hand-held controller 100 to the main microcontroller 252 in the control box 45.

APPENDIX A

| Water Conditions | Recommended System Configurations |
| --- | --- |
| Water within all specifications, flowing pressure above 45 psig | Base Filtration System without water pressure booster. |
| Water within all specifications, flowing pressure below 45 psig | Base Filtration System with water pressure booster. |
| Excessive turbidity, and/or chlorine, and/or presence of tastes and odors, flowing pressure above 45 psig | Base Filtration System without water pressure booster. |
| Excessive turbidity, and/or chlorine, and/or presence of tastes and odors, flowing pressure below 45 psig | Base Filtration System with water pressure booster. |
| Bacteriological problems found, flowing pressure above 45 psig. | UV System without water pressure booster. |
| Bacteriological problems found, flowing pressure below 45 psig. | UV System with water pressure booster. |
| Hardness and/or alkalinity and/or TDS exceed specifications, no bacteriological problems found, flowing pressure above 45 psig | Ion Exchange System without pressure booster. |
| Hardness and/or alkalinity and/or TDS exceed specifications, no bacteriological problems found, flowing pressure below 45 psig | Ion Exchange System with pressure booster. |
| Hardness and/or alkalinity and/or TDS exceed specifications, bacteriological problems found, flowing pressure above 45 psig | Ion Exchange System with UV module, without water pressure booster. |
| Hardness and/or alkalinity and/or TDS exceed specifications, bacteriological problems found, flowing pressure below 45 psig | Ion Exchange System with UV module, with water pressure booster. |
| Chlorides and/or sulfates exceed nspecifications | Lancer Modular Water Treatment System cannot be used. |

A circuit 111 operates an LED display 112 on the hand-held unit 100. The microcontroller 106 operates under program control to output SD clock, load, and data signals which generate displays by the LED display circuit 111. A reset signal 115 generates a display when a reset occurs.

A ROM memory 116 stores program instructions which control the operation of the microcontroller 106 through an address data bus 117. A latch memory 118 is coupled to the bus 117 to enable multiplexing of operating data and address data on the bus 117.

Figure 6C:
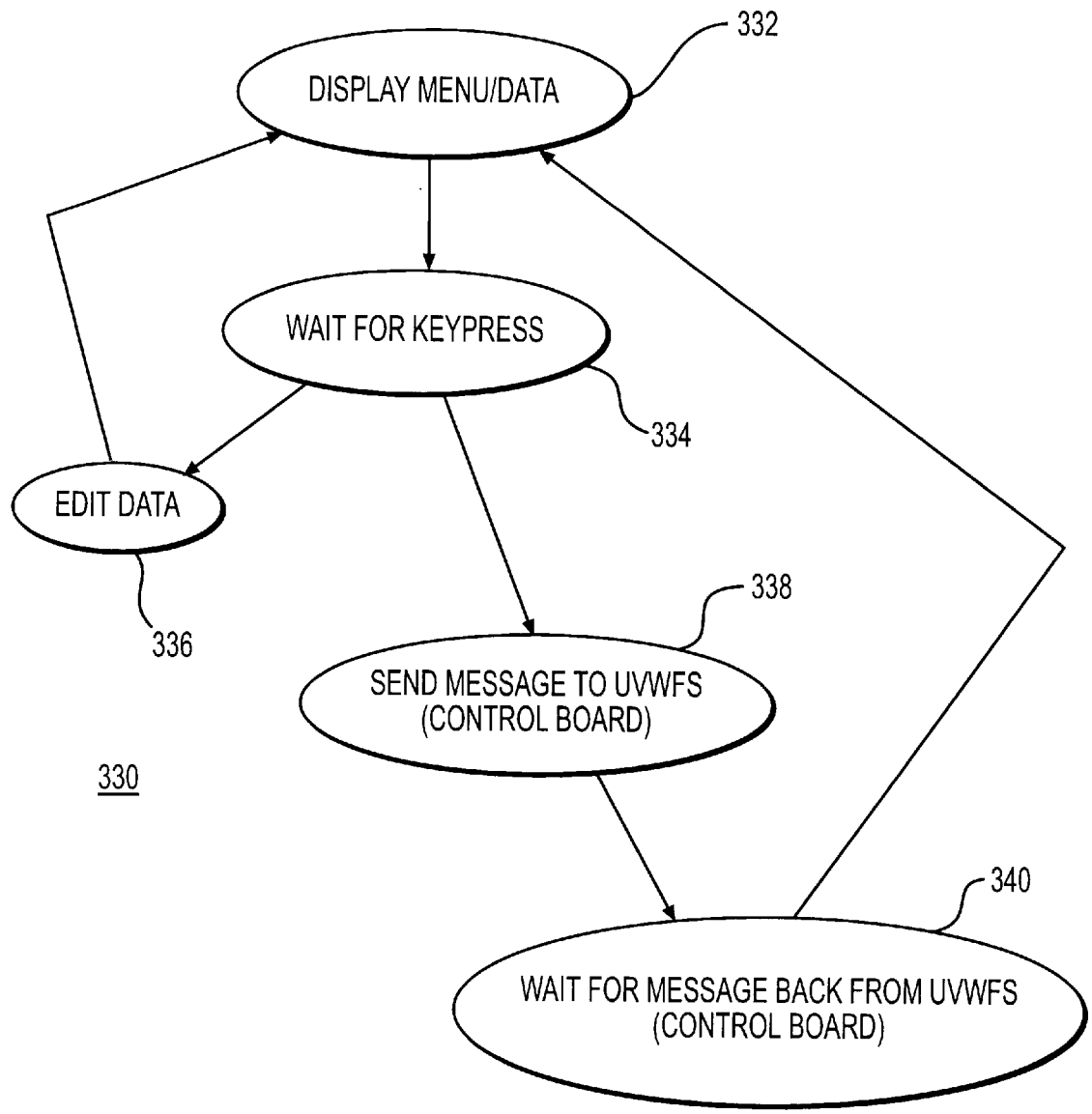
FIG. 6C is a functional block diagram representing programmed logic processes performed by a microprocessor in the hand-held controller of FIG. 6A.

The microcontroller 106 generally operates as indicated by the functional block diagram 330 of FIG. 6C. This high level diagram represents the general manner in which the microcontroller 106 responds to button entries with execution of instructions from the program RAM 116.

The current menu or current data entry or current data read from the main controller 262 or any data write to the main controller is displayed as indicated by block 332. The next press of the edit key or the enter key is awaited as indicated by block 334.

APPENDIX B

Reference Character List

| Ref. Char. | Description | Quan. |
| --- | --- | --- |
| 1 | Fitting, ⅜ NPT × ⅜ Flare | 1 |
| 2 | Fitting, Adaptor, ION to ⅜ FL | 2 |
| 3 | Fitting, ⅜ NPT × ⅜ NPT | 1 |
| 4 | Fitting, Elbow, ⅜ Fl × ⅜ npt. | 2 |
| 5 | Fitting, Watermeter to ⅜ Flare | 1 |
| 6 | Bushing, ¾ × ⅜ | 2 |
| 7 | Fitting, TEE | 1 |
| 8 | O-ring, 2-012 | 4 |
| 9 | O-ring, 2-111 | 4 |
| 10 | E-ring, TRUARC 5133-62 | 2 |
| 11 | Cap, Protective Shipping, 7/16-20 | 2 |
| 12 | Screw, 10-24x . 375, PH, PH, TT, SS | 4 |
| 13 | Screw, 10-24x.500. HHD, W/W. SL | 2 |
| 14 | Screw, 10-32x1.00, PH, PH, TT, ST, ZP | 4 |
| 15 | Screw, 10-32x1.50, PH, PH, TT, ST, ZP | 2 |
| 16 | Screw, 10-32x.500, PH, PH, TT, ST, ZP | 14 |
| 17 | Screw, 10-14x.50, PH, PH, PL, ST, ZN | 6 |
| 18 | Seal, Flare | 22 |
| 19 | Bracket, Mounting, UV Chamber | 2 |
| 20 | Cover, Electric Box Assembly | 1 |
| 21 | Clamp, Oeitiker | 1 |

APPENDIX B-continued

Reference Character List

| Ref. Char. | Description | Quan. |
|---|---|---|
| 22 | Tube, Pressure Pilot | 1 |
| 23 | Tube, Purge Line | 1 |
| 24 | Plate, MTG, Water Filtration System | 1 |
| 25 | Bracket, Prefilter Assembly | 1 |
| 26 | Bracket, Carbon Filter Assembly | 1 |
| 27 | Plate, Spacer | 1 |
| 28 | Tie plate, Regen. Assembly | 1 |
| 29 | Tube Assembly, Input Valve to Filter | 1 |
| 30 | Tube Assembly, UV to Watermeter | 1 |
| 31 | Tube Assembly, Filter to UV | 1 |
| 32 | Tube Assembly, Input Valve to Pump | 1 |
| 33 | Tube Assembly, Pump to Filter | 1 |
| 34 | Tube Assembly, Filter to Watermeter | 1 |
| 35 | Hose Assembly, Filter to Ion | 1 |
| 35 | Hose Assembly, Ion to UV | 2 |
| 37 | Hose Assembly, Pump to Bladder Tank | 1 |
| 38 | Hose Assembly, Bladder Tank to Filter | 1 |
| 39 | Filter Assembly, Sediment Prefilter | 1 |
| 40 | Microfilter Assembly, Carbon | 1 |
| 41 | Ion Exchange Assembly | 1 |
| 42 | UV Chamber Assembly | 1 |
| 43 | Pump Assembly | 1 |
| 43B | Pump Assembly Without Bypass | 1 |
| 44 | Flowmeter, Water | 1 |
| 45 | Electric Box Assembly, Wats | 1 |
| 46 | Fitting/Valve Assembly, Output | 1 |
| 47 | Fitting/Valve Assembly, Input | 1 |
| 48 | Tank Assembly, Bladder | 1 |
| 1A | UV Diode Harness, Lancer | 1 |
| 2A | Aperture, Sensor Sub-Assembly | 1 |
| 3A | Plug. Sensor Sub-Assembly | 1 |
| 4A | Lens, Sensor Sub-Assembly | 1 |
| 5A | Washer, Teflon, Sensor | 1 |
| 6A | Cap, Sensor Sub-Assembly | 1 |
| 7A | Body, Sensor, Sub-Assembly | 1 |
| 8A | O-ring | 1 |
| 9A | O-ring | 1 |
| 10A | O-ring | 1 |
| 11A | Nut, Probe | 1 |
| 12A | DP 190 Expoxy | .1038 IN3 |

APPENDIX C

| Priority | Description | Type | Audio/Visual Code | Reset |
|---|---|---|---|---|
| 1 | UV intensity low for 5 continuous seconds. | Disabling | 1 red blink and speaker tone every 5 seconds | Automatic when the intensity is restored. |
| 2 | Water pressure below critical setpoint (low water pressure retry alarm failed after 10 minutes of trying). See note below the table. | Disabling | 2 red blinks and speaker tone every 5 seconds | Disconnect and reconnect power to the system. |
| 3 | Carbon block filter days in use exceeded set threshold plus 14 days. | Disabling | 3 red blinks and speaker tone every 5 seconds | Select New CBf on hand-held menu |
| 4 | Prefilter days in use exceeded set threshold plus 14 days. | Disabling | 4 red blinks and speaker tone every 5 seconds. | Select New SDf on the hand-held menu. |
| 5 | Ion Exchange after allowed capacity in gallons exceeded. | Disabling | 5 red blinks and speaker tone every 5 seconds. | Select New Ion on the hand-held menu. |
| 6 | Booster pump time-out when booster pump runs without raising the water pressure after 4 pump warning alarms (after approx. 2 hours). | Disabling | 6 red blinks and speaker tone every 5 seconds. | Disconnect and reconnect power to the system. |
| 7 | Low pressure retry alarm. See note below the table. | Disabling | 7 red blinks and speaker tone every 5 seconds. | Disconnect and reconnect power to the system. |
| 8 | UV intensity at only 5% more than the critical UV alarm threshold. | Warning | 1 yellow blink every 5 seconds and speaker tone every 1 minute. | Automatic when the intensity is restored. |
| 9 | Carbon block filter days in use exceeded set threshold. | Warning | 2 yellow blinks every 5 seconds and speaker tone every 1 minute up to 2 weeks. | Select New CBf on hand-held menu |
| 10 | Prefilter days in use exceeded set threshold | Warning | 3 yellow blinks every 5 seconds and speaker tone every 1 minute up to 2 weeks. | Select New SDf on the hand-held menu |
| 11 | Ion Exchange at 90% of the computed capacity (gallons). | Warning | 4 yellow blinks every 5 seconds and speaker tone every 1 minute. | Select New Ion on the handheld menu. |
| 12 | No Carbonator Pump activity after new system install (not connected or no activity). | Warning | 5 yellow blinks every 5 seconds and speaker tone every 1 minute. | Dispense enough drinks to run a carbonator pump. |
| 13 | Water pressure below set threshold. every 1 minute. | Warning | 6 yellow blinks every 5 seconds and speaker tone | Automatic when the pressure is restored. |
| 14 | Booster pump time-out when booster pump runs continuously for 3 minutes without raising the water pressure above cut-off threshold. The booster is then disabled for 30 minutes before it retries raising the system pressure again. This warning is active during the 30 minutes the booster pump is disabled. | Warning | 7 yellow blinks every 5 seconds and speaker tone every 1 minute. | Disconnect and reconnect power to the system. |

APPENDIX D

SYSTEM COMMUNICATION COMMANDS WITH THE HAND HELD UNIT

| Command | Description |
|---|---|
| GET_CAPACITY | Get Ion Exchange capacity in gallons |
| SET_CAPACITY | Set Ion Exchange capacity in gallons |
| NEW_IONS | Install a new Ion Exchange Unit |
| NEW_LAMP | Install a new UV Bulb |
| NEW_CB_FILTER | Install a new Carbon Filter |
| NEW_SD_FILTER | Install a new Sediment Filter |
| GET_TIME_LAMP | Get Install time for UV Lamp |
| GET_TIME_CB_FILTER | Get Install time for Carbon Filter |
| GET_TIME_SD_FILTER | Get Install time for Sediment Filter |
| GET_TIME_ION_EXCH | Get Install time for Ion Exchange Unit |
| GET_TIME_SYSTEM | Get Current System Time |
| GET_GALS_CB_FILTER | Get Install gallons for Carbon Filter |
| GET_GALS_SD_FILTER | Get Install gallons for Sediment Filter |
| GET_GALS_ION_EXCH | Get Install gallons for Ion Exchange Unit |
| GET_GALS_SYSTEM | Get Current System Gallons |
| GET_WATER_FLOW_RATE | Get the current water flow rate |
| GET_WATER_PRESSURE | Get the current water pressure |
| GET_CARBONATOR_STATE | Get the ON/OFF state of the carbonator pump |
| GET_UV SENSOR_VALUE | Get the current UV sensor reading |
| SET_CONFIG | Set Configuration of installed options * |
| GET_CONFIG | Get Configuration of installed options |
| GET_ALARMS | Get Alarm Status |
| SET_BP_ON | Set Booster Pump ON Pressure |
| SET_BP_OFF | Set Booster Pump OFF Pressure |
| GET_UV_ALARM | Get current UV alarm Threshold setting |
| GET_VERSION | Firmware version |
| SET_UV_ALARM | Set current UV alarm Threshold setting |
| GET_PSI_WARNING | Get the pressure warning alarm threshold |
| SET_PSI_WARNING | Set the pressure warning alarm threshold |
| GET_PSI_ALARM threshold | Get the current pressure alarm |
| SET_PSI_ALARM threshold | Set the current pressure alarm |
| INSTALL_RESET routine | Invoke the new system initialization |
| GET_CB_PERIOD period | Get the current carbon filter days |
| GET_SD_PERIOD period | Get the current sediment filter days |
| SET_CB_PERIOD period | Set the current carbon filter days |
| SET_SD_PERIOD period | Set the current sediment filter days |
| GET_BP_ON | Read Booster Pump ON Pressure |
| GET_BP_OFF | Read Booster Pump OFF Pressure |

* Configuration options are UV Lamp, Ion Exchange, & Booster Pump

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water treatment apparatus having a conduit forming a flow path for water being treated, the apparatus comprising;

a booster pump connected to the flow path;

a filer module connected in the flow path;

a pressure sensor coupled to the flow path;

a flow sensor coupled to the flow path;

an ion exchange chamber connected in the flow path; and a monitoring and control system responding to an output from the pressure sensor to provide ON/OFF cycling control of the booster pump for outlet water pressure control;

the monitoring and control system further responding to an output from the flow sensor to determine total flow over time;

the monitoring and control system generating a filter replacement alarm when a low water pressure setpoint is detected and an ion-exchange-resin replacement alarm when a setpoint total water flow is reached;

the monitoring and control system including a first microcontroller system for storing control and process data, for processing feedback data from the sensors, for generating ON/OFF control commands to the booster pump, and for tracking elapsed time from filter and ion exchange chamber installation; and the first microcontroller system storing a table of alarms classified as disabling or warning for display and/or readout, the alarms being listed in the table according to predetermined priorities to facilitate clearing of activated alarms.

2. The apparatus of claim 1 wherein the first microcontroller system operates an external display circuit to display only the highest priority alarm and to display lower priority alarms in descending priority order as successive alarms are cleared.

3. The apparatus of claim 1 further comprising:

an operator interface controller including a second microcontroller system for transmitting command messages to the first microcontroller system and for receiving data messages from the first microcontroller; the first and second microcontroller systems being linked or connected to enable communication of the messages;

switching means for operator entry of data readout requests, data writing requests, and apparatus parameter entry commands; and a display circuit operated by the second microcontroller system to display data and menu selections.

4. The apparatus of claim 3 wherein the operator interface controller is a hand-held unit having a connector for coupling with another connector connected to the first microcontroller system and mounted on a control box housing the monitoring and control circuitry including the first microcontroller system.

5. The apparatus of claim 4 wherein the hand-held unit is provided with an LED display panel and a plurality of key switches on a front side thereof; the key switches include at least menu and submenu select switches, display cursor control switches and UP/DOWN control switches for selected display digits.

6. A water treatment apparatus for treating water supplied to a particular situs, where the apparatus is to be located, and tested to identify water problems, the apparatus comprising:

an arrangement of selectable modules in fluid communication with each other, the modules including a filter module and other water treatment modules;

wherein the other water treatment modules include a UV treatment module, an ion exchange module, and a booster pump module;

the booster pump module including a flow bypass operable to regulate pump outlet flow;

the modules further including a control module structured with control and monitoring circuitry; and the circuitry responds to an outlet water pressure and includes means for controlling an ON/OFF cycle of the booster pump.

7. A water treatment apparatus for treating water supplied to a particular situs, where the apparatus is to be located, and tested to identify water problems, the apparatus comprising:

an arrangement of selectable modules connected in fluid communication with each other, the modules including a filter module and other water treatment modules;

wherein the other water treatment modules include a UV treatment module, a booster pump module, and an ion exchange module;

the booster pump including a flow bypass operable to regulate pump outlet flow;

counting means for counting time elapsed from installation of the filter module and for generating an alarm when an expected life of the filter module is reached; and the filter module including a prefilter and a microfilter, the counting means counting elapsed time from installation for the prefilter and the microfilter, and control and monitoring circuitry generating an alarm when an expected life of the prefilter or an expected life of the microfilter is reached.

8. A water treatment apparatus for treating water supplied to a particular situs, where the apparatus is to be located, and tested to identify water problems, the apparatus comprising:

an arrangement of selectable modules connected in fluid communication with each other, the modules including a filter module and other water treatment modules;

the other water treatment modules including an ion exchange module;

wherein a resin is included in the ion exchange module; and a control and monitoring circuitry including means for counting time elapsed from installation of the ion exchange module or from a replacement of ion exchange resin and for generating an alarm when a stored expected resin life is reached.

9. A water treatment apparatus for treating water supplied to a particular situs, where the apparatus is to be located, and tested to identify water problems, the apparatus comprising:

an arrangement of selectable modules connected in fluid communication with each other, the modules including a filter module and other water treatment modules;

the other water treatment modules including a UV treatment module and an ion exchange module; and a control and monitoring circuitry including means for counting elapsed time from installation of the UV module, from installation of the ion exchange module or from replacement of ion exchange resin and for generating an alarm when a stored expected life of the UV module or resin of the ion exchange module is reached.

10. A water treatment apparatus for treating water supplied to a particular situs, where the apparatus is to be located, and tested to identify water problems, the apparatus comprising:

an arrangement of selectable modules connected in fluid communication with each other, the modules including a filter module and other water treatment modules including an ion exchange module; and the apparatus including a flow sensor which generates a signal representative of water flow through the water treatment apparatus, and control and monitoring circuitry responds to the flow sensor to compute total water flow over time and generates an alarm indicating a need for ion exchange module replacement when a stored expected-life value of total water flow is reached.

11. A water treatment apparatus for treating water supplied to a particular situs, where the apparatus is to be located, and tested to identify water problems, the apparatus comprising:

an arrangement of selectable modules connected in fluid communication with each other, the modules including a filter module and other water treatment modules;

a dispenser having a carbonator pump for producing carbonated water for mixing with syrup; and the water treatment apparatus having its outlet water coupled to the carbonator pump;

the filter module including a prefilter and a microfilter;

the other water treatment modules including a UV treatment module, a booster pump module, a control box module, and an ion exchange module; and the control box module having control and monitoring circuitry coupled to included water treatment modules and the booster pump module to provide monitoring and/or control of the included modules.

* * * * *

UNITED STATES PATENT AND TRADEMARK OFFICE
CERTIFICATE OF CORRECTION

PATENT NO. : 6,312,589 B1
DATED : November 6, 2001
INVENTOR(S) : George J. Jarocki et al.

It is certified that error appears in the above-identified patent and that said Letters Patent is hereby corrected as shown below:

<u>Column 21, claim 1,</u>
Line 55, "filer" should read -- filter --.

Signed and Sealed this

Ninth Day of April, 2002

Attest:

JAMES E. ROGAN
*Attesting Officer*     *Director of the United States Patent and Trademark Office*